US012757295B1

(12) United States Patent
Ganahl

(10) Patent No.: US 12,757,295 B1
(45) Date of Patent: Oct. 6, 2026

(54) PORTABLE FOOD HEATING SYSTEM AND METHOD

(71) Applicant: Joseph Ganahl, Honolulu, HI (US)

(72) Inventor: Joseph Ganahl, Honolulu, HI (US)

( * ) Notice: Subject to any disclaimer, the term of this patent is extended or adjusted under 35 U.S.C. 154(b) by 0 days.

(21) Appl. No.: 19/256,965

(22) Filed: Jul. 1, 2025

Related U.S. Application Data

(63) Continuation-in-part of application No. 18/375,898, filed on Oct. 2, 2023, now Pat. No. 12,484,732.

(51) Int. Cl.
*H05B 1/02* (2006.01)

(52) U.S. Cl.
CPC .................................. *H05B 1/0261* (2013.01)

(58) Field of Classification Search
CPC ........ A47J 36/2483; A47J 47/14; A47J 36/10; A47J 36/025; A47J 36/38; A47J 39/006; A47J 39/02; A47J 36/32; A47J 2027/043; A47J 27/002; A47J 27/04; A47J 27/09; A47J 27/10; A47J 27/17; A47J 27/18; A47J 36/16; A47J 37/01; A47J 37/0629; A47J 44/00; A47J 47/145; H05B 1/0261
USPC ........... 219/387, 395, 398, 413, 428; 99/451
See application file for complete search history.

(56) References Cited

U.S. PATENT DOCUMENTS 6,541,738 B1 * 4/2003 Casasola ................ A45C 11/20 219/428
9,521,926 B1 * 12/2016 Leabman ............. H05B 1/0266
9,581,972 B1 * 2/2017 Arrow .................... G04C 10/00
2005/0103212 A1 * 5/2005 Cronin ................ A47J 36/2483 99/467
2010/0059039 A1 * 3/2010 Cudnohoske ........... F24V 30/00 126/263.01
2011/0143000 A1 * 6/2011 Fiset ......................... A23L 5/32 426/248
2013/0047701 A1 * 2/2013 Peltz ...................... G01V 11/00 73/23.2
2015/0136769 A1 * 5/2015 Quinn ..................... A47J 36/10 220/240
2016/0128503 A1 * 5/2016 Xu ........................... H05B 6/12 99/326

(Continued)

FOREIGN PATENT DOCUMENTS

CN 105852370 A * 8/2016 .......... A47J 36/2483

OTHER PUBLICATIONS

English translation of CN-105852370-A (Year: 2016).*
Mophie Charge Stream powerstation Wireless user manual (Year: 2018).*

*Primary Examiner* — Chris Q Liu
(74) *Attorney, Agent, or Firm* — Edmond DeFrank

(57) ABSTRACT

The embodiments disclose a portable, battery-powered food warming system comprising a thermally conductive, removable food container within an insulated housing. A heating element thermally coupled to the container is powered solely by an internal battery. An inner lid retains heat and prevents leakage, while an outer lid secures the container in the housing. A temperature control system with at least one sensor monitors and regulates the heating element. A programmable timer enables automated and delayed heating operations. A user interface on the housing allows input of a target temperature, heating duration, and start time. The system provides precise, self-contained food warming to a set temperature without external power, supporting portable use across various settings.

3 Claims, 26 Drawing Sheets

(56) References Cited

U.S. PATENT DOCUMENTS

| | | | | |
|---|---|---|---|---|
| 2018/0099734 | A1* | 4/2018 | Schibli | B63H 21/21 |
| 2018/0255965 | A1* | 9/2018 | Bauer | A47J 37/01 |
| 2020/0361824 | A1* | 11/2020 | Helskens | C09D 5/00 |

* cited by examiner

PORTABLE FOOD HEATING SYSTEM AND METHOD

BACKGROUND

Food spoilage is a natural occurring process. When food is subjected to temperatures in the "danger zone" above 40-degree f and below 140-degree f the toxins multiply at an exponential rate. The toxins in turn leave bacteria on your food. Bacteria, yeasts, and molds are among common causes of spoilage and food poisoning. Chilling food helps delay the food poisoning and spoiling process because the toxins grow at a slower rate, thus leaving fewer bacteria, and keeping food safe to eat for a longer period of time. Many portable containers are available to keep food chilled for a period of time. One impact of chilling food is that it can impact sensory details such as texture, taste, and smell. Human beings evolved to prefer hot food. Warmth enhances flavor on the sensory papillae of our tongues and heating food boosts its energy value.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

It should be noted that the descriptions that follow, for example regarding a portable food heating system and method is described for illustrative purposes. The underlying system can apply to any number and multiple types of foods. In one embodiment of the present invention, the portable food heating system and method can be configured using a wireless app and digital devices. The portable food heating system and method can be configured to include real-time temperature monitoring and can be configured to include rechargeable batteries using the present invention.

Figure 1:
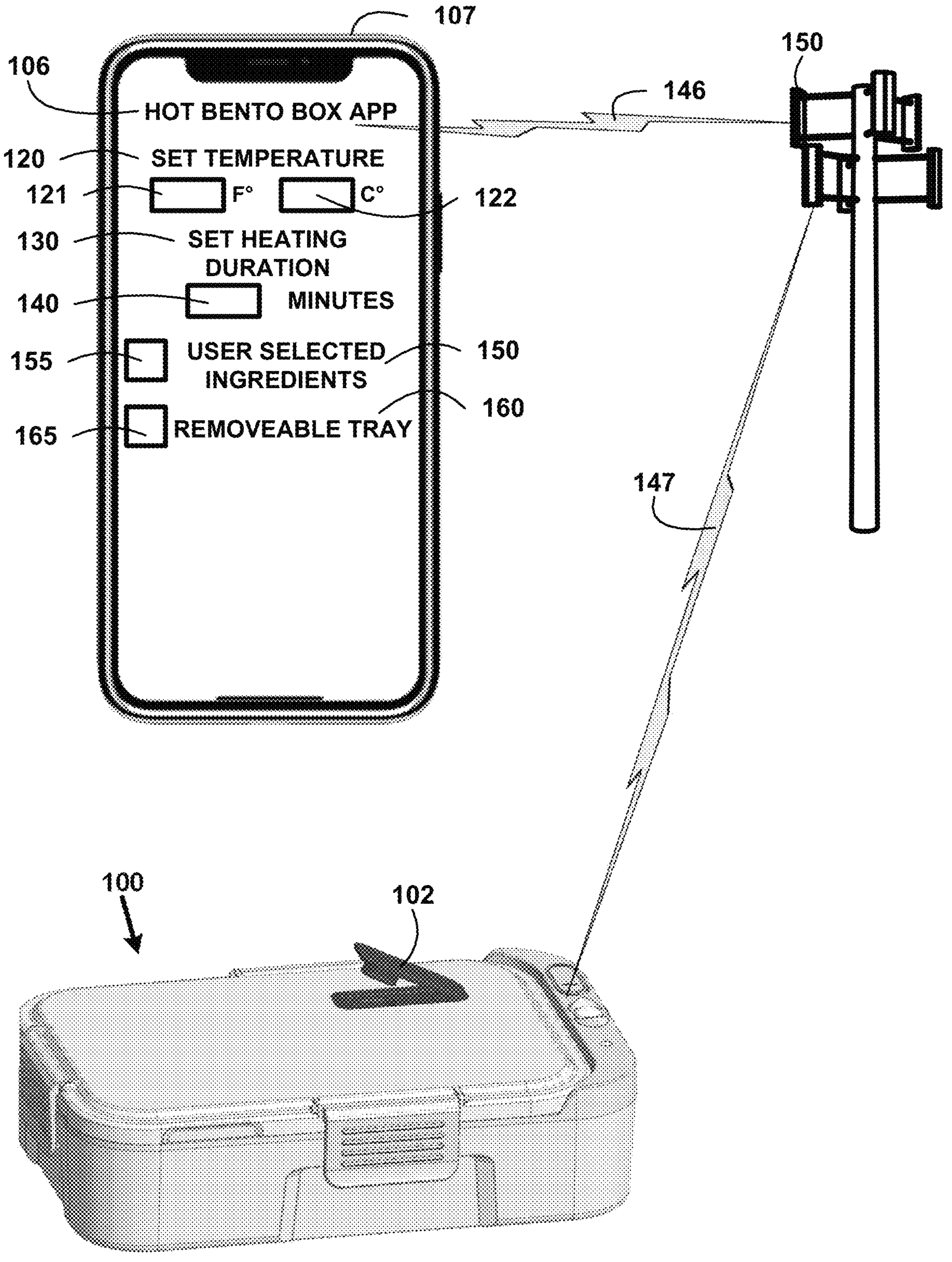
FIG. 1 shows for illustrative purposes only an example of hot bento box app of one embodiment.

FIG. 1 shows for illustrative purposes only an example of hot bento box app of one embodiment. FIG. 1 shows the waterproof bento box 100 having a pressure equalization valve 102 wirelessly connected for communication between the waterproof bento box 100 and hot bento box app 106. In one embodiment, a cellular tower 150 provides the signal system 146 and 147 for the bidirectional communication with a hot bento box app 106. In another embodiment the signal system can be WIFI, RFID, NFC, and others.

A user's digital device 107 with the hot bento box app 106 may be used to set temperature 120 with the cellular signal system 146 and 147. The user sets the temperature in F° 121 with an option for C° 122. The user may set heating duration 130 entering in the number of minutes 140. They may be heating user selected ingredients 150 so indicating with the check box 155. The user may optionally select a removable tray 160 with a check box 165. The hot bento box app 106 as requested by the user may additionally provide stored recipes that can guide the user on temperatures, timing, and other aspects of heating their meal. The hot bento box app

106 also provides location tracking, image and comment data upload/storage and other features to assist the user of one embodiment.

Figure 2:
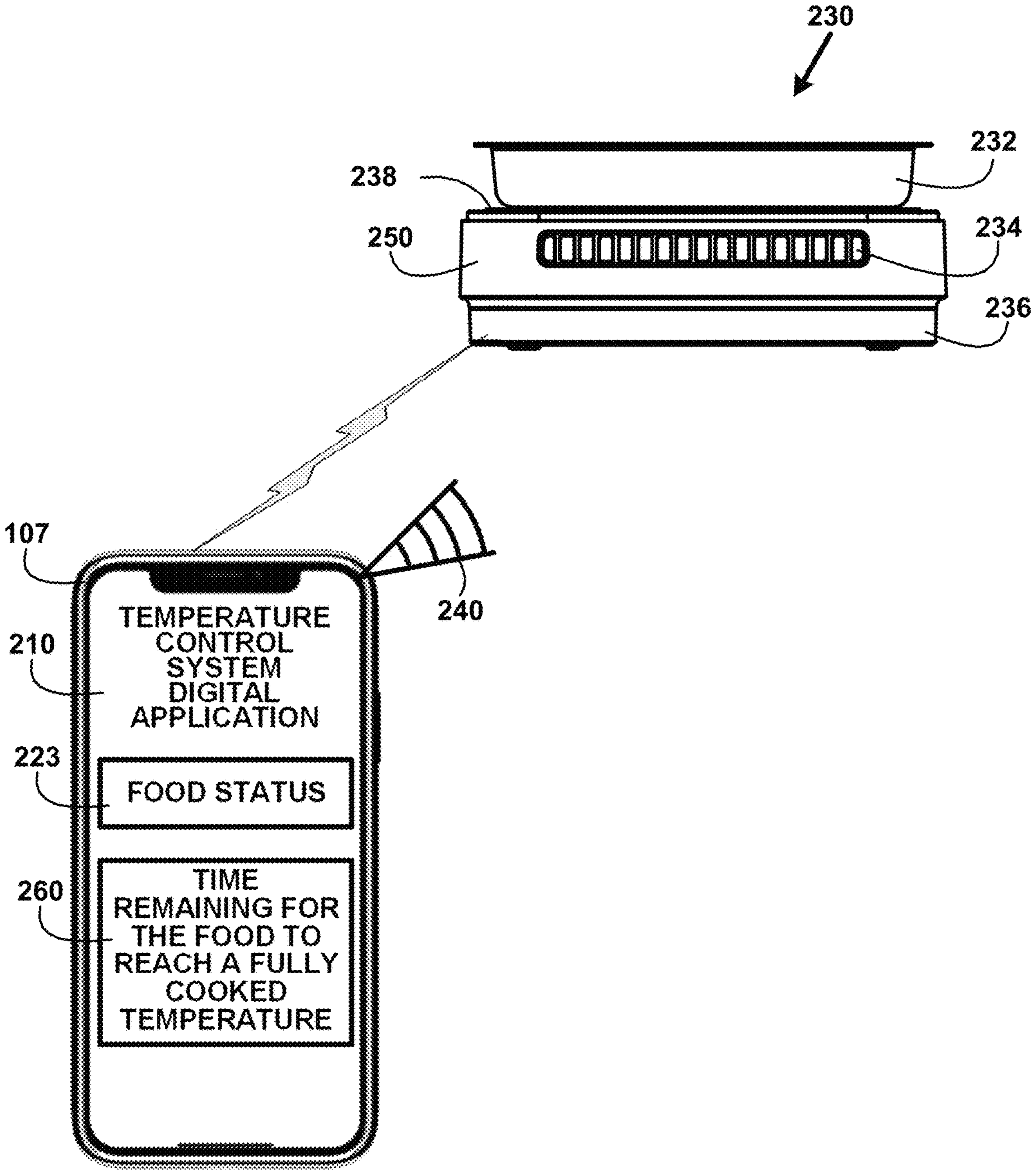
FIG. 2 shows for illustrative purposes only an example of a wireless app for battery power cooking system of one embodiment.

FIG. 2 shows for illustrative purposes only an example of a wireless app for battery power cooking system of one embodiment. FIG. 2 shows the modular portable battery powered cooktop 230 that includes a temperature control system digital application 210 for installation on a user's digital device 107 including, for example, a smartphone, tablet, laptop computer, and other digital devices. The temperature control system digital application 210 installed on a user's digital device 107 is configured for displaying food status 223 on a digital screen and broadcasting audible food status alerts 240. The user can tap the temperature control system digital application 210 icon and receive intermediate food status alerts 240 to check the current temperature and a calculated approximate time remaining for the food to reach a fully cooked temperature 260.

In one embodiment, the temperature control system digital application 210 digital application may display the temperature selection controls of the modular, portable, and battery-powered cooktop digital application module. This allows the user to set the desired temperature via the user's digital device 107. The user may want to turn off or adjust the temperature which they can perform using the temperature control system digital application of one embodiment. In another embodiment, the modular, portable, battery-powered cooktop temperature control system digital application may include recipes with preset cooking instructions.

The portable battery powered cooktop 230 is a meal heating system with a meal cover, removable meal tray 232 on top of a heat plate 238, air buffer vent 234, a heating device 250 with LED indicators, and a high temperature/high-capacity battery 236 of one embodiment.

Figure 3:
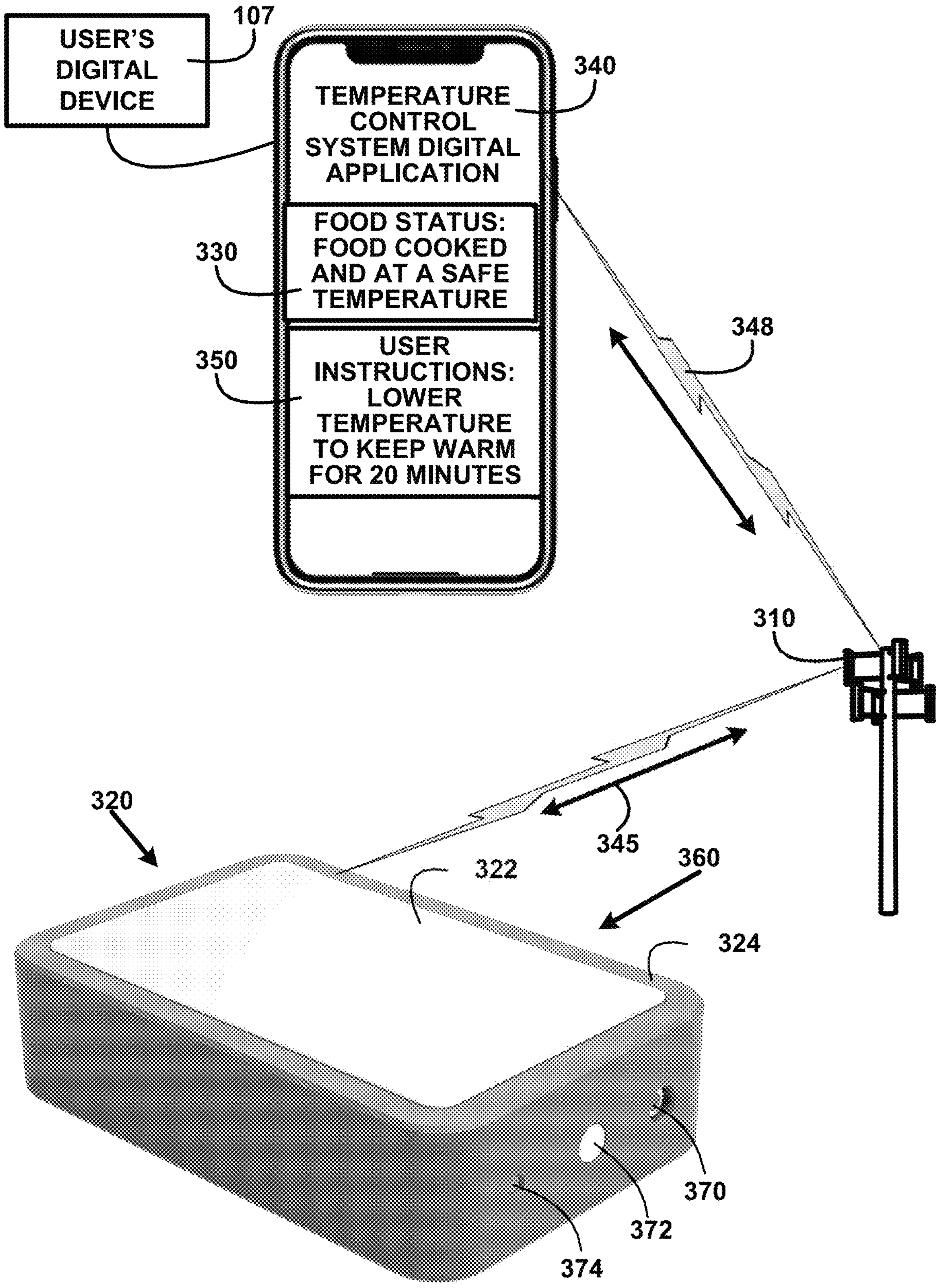
FIG. 3 shows for illustrative purposes only an example of a wireless app for buffet warming system of one embodiment.

FIG. 3 shows for illustrative purposes only an example of a wireless app for buffet warming system of one embodiment. FIG. 3 shows transmitting food status information to a user and receiving user instructions: lower temperature to keep warm for 20 minutes 350 from a user's digital device 107 using a temperature control system digital application 340. The Buffet Warmer 360 temperature control system is coupled to the temperature control system digital application 340. Temperature control system bidirectional communication 345 allows temperature control system digital application 340 transmissions, for example, to a cell tower 310, and Bluetooth and WIFI connection to a user's digital device 107.

The temperature control system digital application 340 includes the temperature control system digital application digital application bidirectional communication 345. The temperature control system digital application 340 installed on the user's digital device 107 will display a food status: food cooked and at a safe temperature 330. The user can transmit 348 to the Buffet Warmer 360 temperature control system user instructions and receive heat and battery status audible and visual alert broadcast.

A buffet warmer food warming module 320. The buffet warmer food warming module 320 is a buffet line heating element. The buffet warmer food warming module 320 is positioned beneath the food dishes to maintain the temperature of the food along the serving line. The buffet warmer food warming module 320 includes a protective heating surface 322 coupled to the main box container 324 configured to produce heat and direct the heat to the bottom of a food container placed onto the protective heating surface 322 for heating the food. The buffet warmer food warming module 320 can be powered by battery or AC power. A power button 372 configured for turning on and off the heating and a power indicator light 374 showing when the heat is on or off. A charging port 370 is available for recharging batteries in the heat tray to maintain the heat and temperature settings for the food being served. The buffet warmer food warming module 320 replaces the noxious sterno can. The buffet warmer food warming module 320 is also referred to herein interchangeably without change in meaning to as a heat tray.

The Buffet Warmer includes heating a temperature control system digital application system digital application for installation on a user's digital device 107 including, for example, a smartphone, tablet, laptop computer, and other digital devices. The temperature control system digital application installed on a user's digital device is configured for displaying the food status alerts on a digital screen and broadcasting audible food and battery status alerts. The user can tap the temperature control system digital application digital application icon and receive intermediate food status alerts to check the current temperature and a calculated approximate time remaining for the food to reach a safe temperature. In one embodiment, the temperature control system digital application digital application may display the temperature selection controls of the Buffet temperature control system digital application module and battery status indication. This allows the user to set the desired temperature using the user's digital device 107 and confirm battery status at a glance. The user may want to turn off or adjust the temperature which they can perform using the temperature control system digital application of one embodiment.

Figure 4:
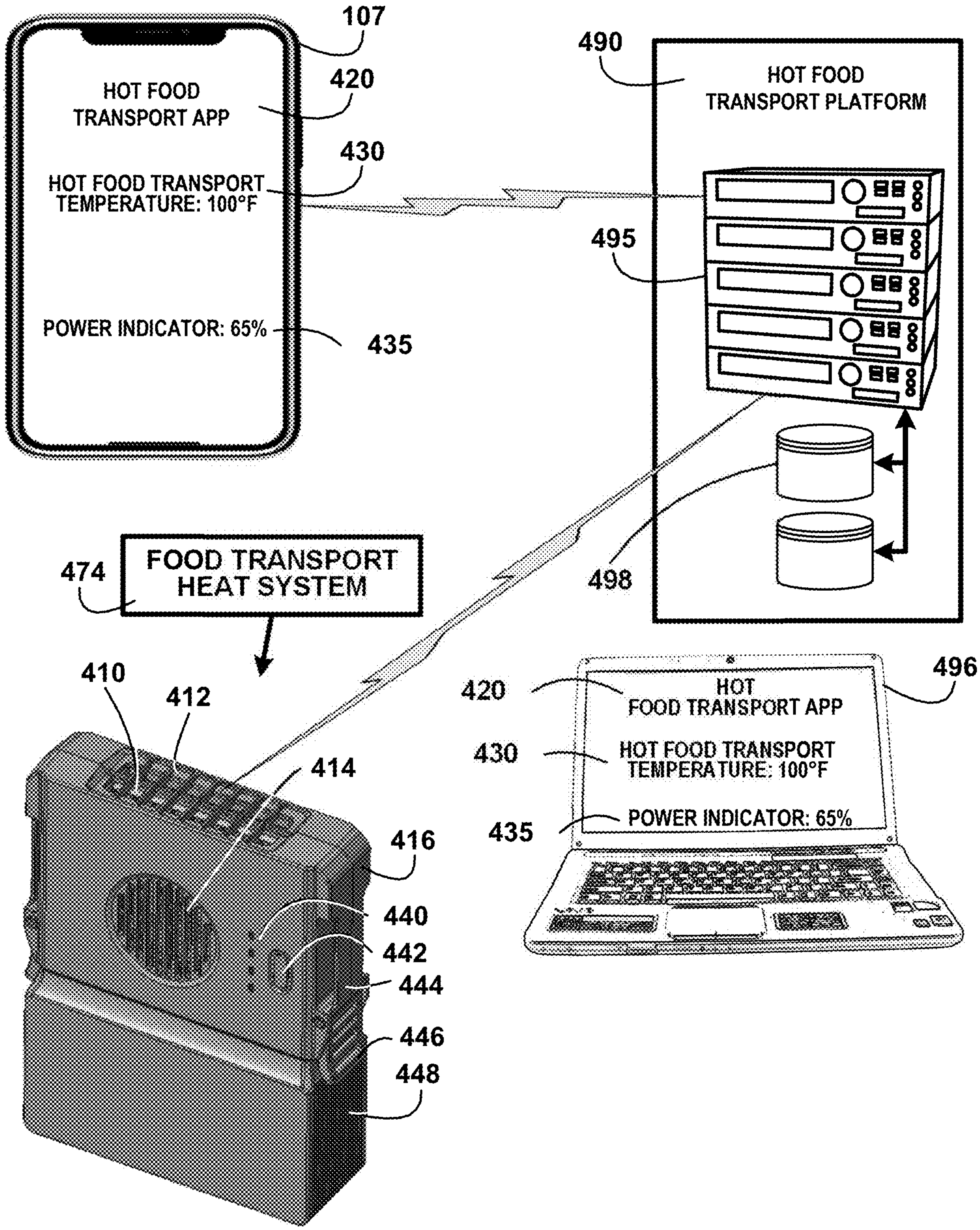
FIG. 4 shows for illustrative purposes only an example of a wireless app for food transport system of one embodiment.

FIG. 4 shows for illustrative purposes only an example of a wireless app for food transport system of one embodiment. FIG. 4 shows a hot food transport platform 490 comprising a plurality of servers 495, a plurality of databases 498, and a platform computer 496. The Food Transport Heat System 474 includes temperature sensors to monitor the temperature inside the insulated food container. Other sensors monitor the battery level. The temperature and battery sensors transmit data continuously to maintain safe temperatures for the food and to ensure adequate battery power.

A user's mobile device 107 having a hot food transport app 420 installed on the user's mobile device 107 displays to the user the hot food transport temperature: 100° F. 430 and power indicator: 65% 435. A platform computer 496 having a hot food transport app 420 displaying the hot food transport temperature: 100° F. 430 and power indicator: 65% 435 of one embodiment. In some embodiments, the cup holder may be substituted with stackable food trays.

The Food Transport Heat System 474 includes a protective screen 412 covering the heat element 410 to prevent accidental burning of fingers or contents. The heater assembly 416 includes a fan intake 414 to produce an air flow to disperse the heat generated around the food uniformly. LED Power level indicators 440 allows the user to determine when the removable high power battery system batteries may need recharging. A power button 442 is used to turn the heater assembly 474 on and off.

An alternative attachment option, in one embodiment, a strap attach point 444 is used to attach a strap for carrying the food transport heat system 474 and the battery is connected directly to the heat assembly 416 and is secured with latches 446. The battery assembly 448 houses the batteries for powering the food transport heat system 474. The food transport heat system 474 of FIG. 4 includes transmitting food status information to a user and receiving user instructions from a user's digital device 107 using a food warming system application of one embodiment.

Figure 5:
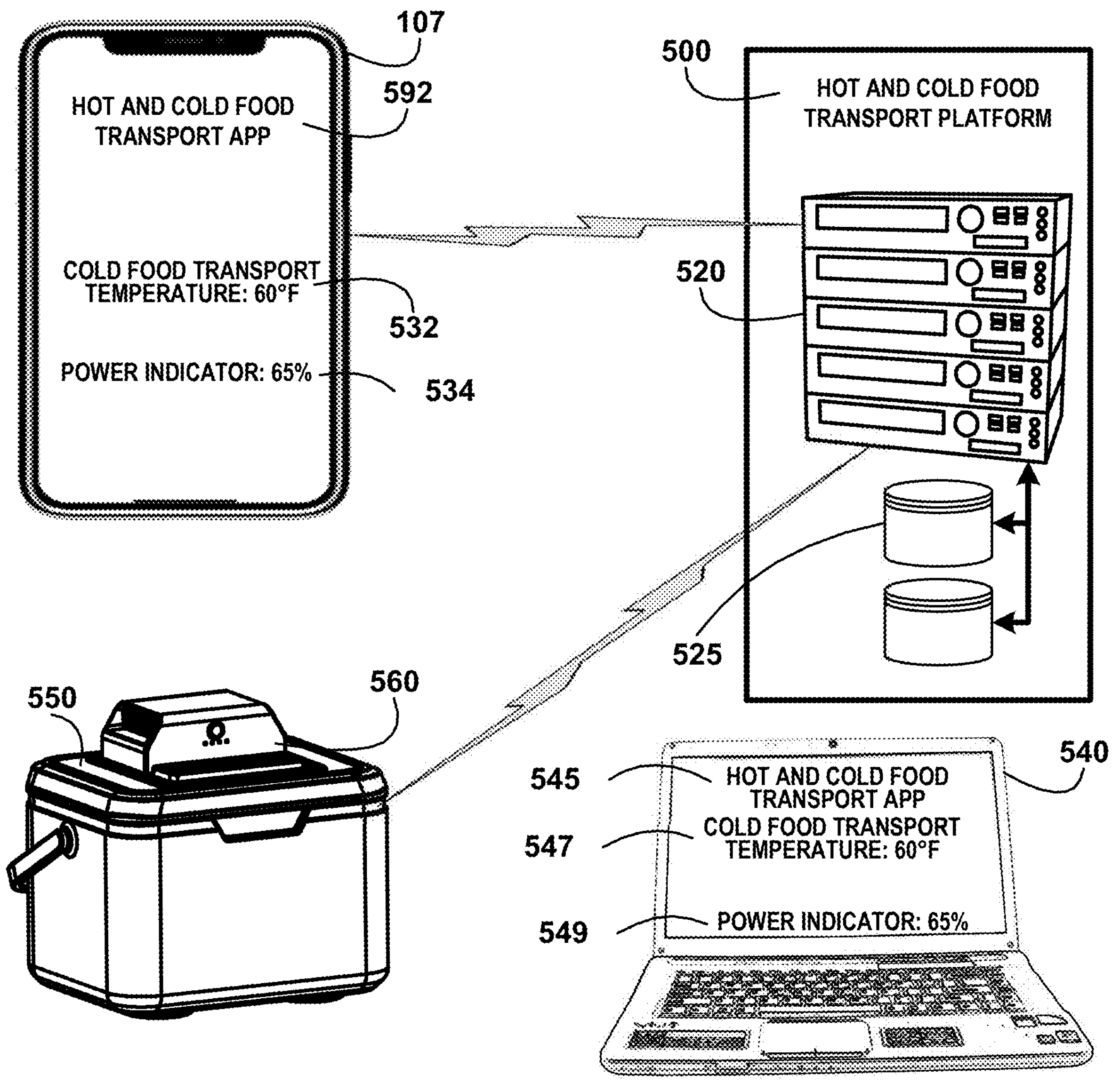
FIG. 5 shows for illustrative purposes only an example of a wireless App for hot and cold beverage or food transport system of one embodiment.

FIG. 5 shows for illustrative purposes only an example of a wireless app for hot and cold beverage or food transport system of one embodiment. FIG. 5 shows for illustrative purposes only an example of a wireless App for hot and cold beverage or food transport system. FIG. 5 shows a hot and cold food transport platform 500 comprising a plurality of servers 520, a plurality of databases 525, and a platform computer 540. The insulated box 550 includes temperature sensors 560 to monitor the temperature inside the insulated box 550. The temperature sensors 560 transmit the temperature continuously to maintain safe temperatures for the food contained within including, in this example, cold beverages. A user's mobile device 107 having a hot and cold food transport app 592 installed on a user's mobile device 107 displays to the user the cold food transport temperature: 60° F. 532 and power indicator: 65% 534. A platform computer 540 having a hot and cold food transport app 545 displaying the cold food transport temperature: 60° F. 547 and power indicator: 65% 549 of one embodiment. In some embodiments, the cup holder may be substituted with stackable food trays.

Figure 6:
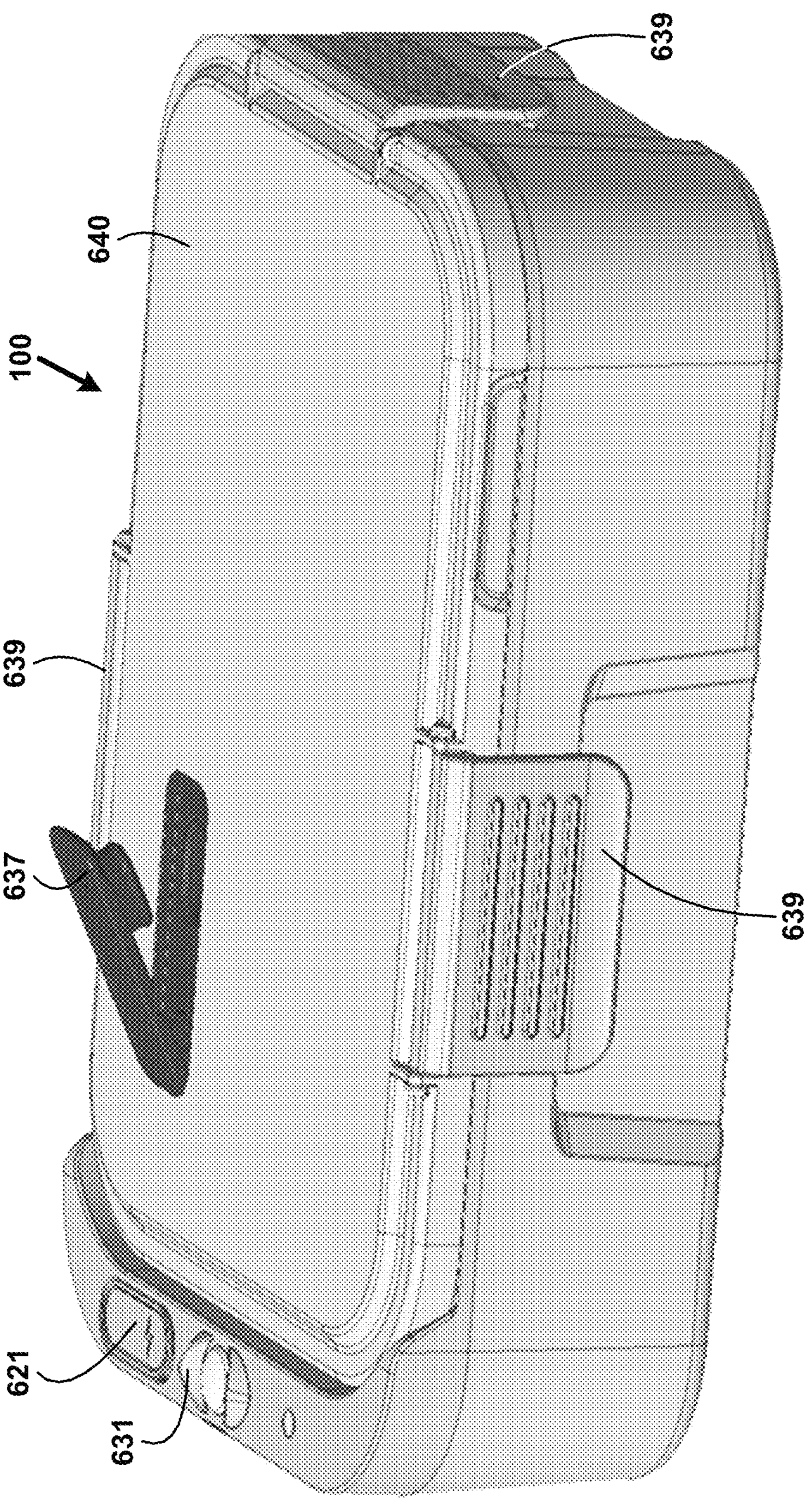
FIG. 6 shows for illustrative purposes only an example of a waterproof bento box of one embodiment.

FIG. 6 shows for illustrative purposes only an example of a waterproof bento box of one embodiment. FIG. 6 shows a waterproof bento box 100. The waterproof bento box 100 includes a waterproof charge cover 631 to prevent spillage of the fluid contents. A pressure equalization valve 637 integrated into the device cover 640 prevents pressure buildup caused by heating the contents, to alleviate pressure when closing cover, release pressure from steam, improve conductive circulation to decrease heating times and increase attainable temperatures. Waterproof charge cover 631 prevents liquid from entering the charger port when not in use.

A waterproof power button with protective ridges 621 is used to turn on and off the waterproof bento box 100. The protective ridges prevents content fluid from leaking into the power system and avoids short circuits. The waterproof power button with protective ridges includes a double tap requirement to prevent an accidental ON. The waterproof charge cover 631 includes a plurality of a latch 639 on multiple sides to secure the waterproof charge cover 631 while heating the contents and while carrying the waterproof bento box 100.

This embodiment of the waterproof bento box 100 includes a plurality of features including a 3-way power supply: 110-240 v ac, 12 v dc, battery with independent protective circuits and resistors for each power source. A removable/replaceable battery provides one of the power supplies.

A Teflon™ coating of stainless steel or aluminum tray for a non-stick surface. This facilitates cleaning the waterproof bento box 100. A removable food tray provides the capability of a user to purchase various prepared meal kits in the removable food tray space for the user to have access to a menu of meals to vary their diet conveniently. The drop-in prepared meal kits may come in various sizes depending on the amount the user wishes to eat. The user removes the standard removable food tray and drops in a meal kit. Food tray silicone drop-in dividers allow the user to change the space available for different food items. For example, a small meal kit can be held in place with the insertion of a food tray silicone drop-in dividers. This will prevent the small meal kit from moving about inside the waterproof bento box 100.

The waterproof bento box 100 safety auto off when food tray is not installed prevents wasting power and the waterproof bento box 100 from overheating without food to absorb the heat. Adjustable temperature settings allow the user to heat various food types at various temperatures appropriate for the food without burning. This further allows a user to adjust the temperature to keep the food warm should the user's meal be interrupted for a period of time. A timer may be set based on user knowledge of what is a reasonable time the user feels is needed to heat the particular meal. The user may not be in near proximity to the waterproof bento box 100 and can utilize the full app control of the device with recipes, location tracking, image and comment data upload/storage with a hot bento box app 106 of FIG. 1 installed on the user's digital device 107 of FIG. 1 for example a smart phone. The hot bento box app 106 of FIG. 1 includes stored recipes that can guide the user on temperatures, timing, and other aspects of heating their meal. The user may set the waterproof bento box 100 timer to begin heating the meal, for example, 15 minutes later so that the meal is heated when the user can access the waterproof bento box 100 of one embodiment.

The rechargeable battery pack is directly connected to an electronic control module which controls power flow, temperature, charging and all battery safety protocols. A power button is also connected to the electronic control module and is used to activate the system. When the system is activated, electrical power flows though the electronic control module and is converted to heat which is then distributed along the heat tray insert foil tape or other conductors that surrounds food. A series of LED indicators are also connected to the electronic control module and show a power level of the rechargeable battery pack. Charging the rechargeable battery pack is accomplished via a battery charge port. When not in use the battery charge port is sealed with a waterproof cover to prevent moisture leakage into the battery charge port. The waterproof cover is removed for charging and a charger plug is inserted into the battery charge port of one embodiment.

The control printed circuit board assembly (electronic control module) is electrically coupled to the rechargeable battery pack. The control printed circuit board assembly (electronic control module) is coupled to a battery charge level device and a thermometer sensor for monitoring food temperature in real time.

A rheostat device for regulating power levels conducting battery energy to a plurality of heat dispensing elements is also controlled by the control printed circuit board assembly of one embodiment. The rechargeable battery pack provides power to operate the food warming system components. The control printed circuit board assembly (electronic control module) controls power flow, temperature, charging and all battery safety protocols. The waterproof power button is also coupled to the control printed circuit board assembly and rechargeable battery packs and is used to activate the system. When the system is activated, electrical power flows through an electronic control module and is converted to heat which is then distributed along the heat tray insert conductors that surround food placed inside the heat tray insert. The LED indicators are also connected to electronic control module and show power levels of the rechargeable battery pack of one embodiment.

The control printed circuit board assembly (electronic control module) includes at least one digital processor, at least one digital memory device. It also includes at least one database; at least one circuit coupled to at least one digital temperature display. And further includes at least one circuit coupled to a temperature control selection device mounted on the heat tray insert mounting ledge.

In another embodiment the user may enter the type of food to be placed in the food warming system into the food warming system digital application installed on the user's digital device 107 of FIG. 1. The food warming system digital application will perform a search and display recipe ingredients, characteristics, visual examples, cooking instructions with minimum food safety temperatures, precautions, spoilage indications and signs, and other information for keeping foods safe for consumption.

The control printed circuit board assembly (electronic control module) includes at least one cellular connectivity device and transceiver for transmitting food status signal alerts, battery charge alerts and receiving user turn-off instructions. The control printed circuit board assembly (electronic control module) includes connectivity devices to Bluetooth® and Wi-Fi to provide communication and control alternatives to the user including voice activated commands.

Figure 7:
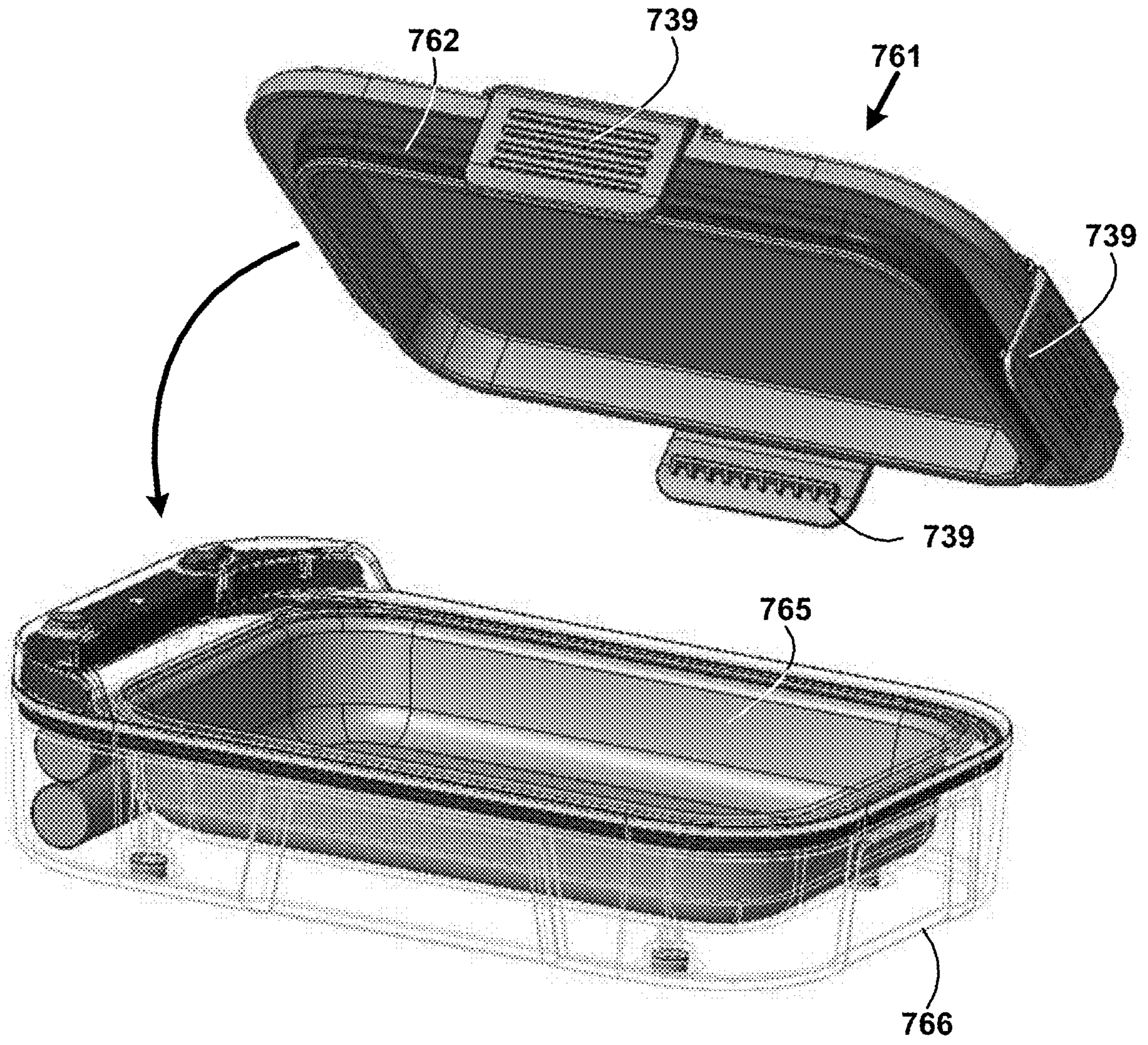
FIG. 7 shows for illustrative purposes only an example of an integral tray of one embodiment.

FIG. 7 shows for illustrative purposes only an example of an integral tray of one embodiment. FIG. 7 shows an integral tray 765 in position within a transparent box image 766 for ease of visibility. A plurality of a latch 739 secures a removable cover 761 to the box. The removable cover 761 includes an O-ring 762 to create a seal of the removable cover 761 to the box. The removable cover is coupled to an Oring to form a watertight seal configured to prevent any leakage, and is child-proof and cannot be accidentally opened by contact with other objects and form a watertight seal on the removable food tray. The O-ring seal prevents the contents from contamination and spillage of one embodiment.

Figure 8:
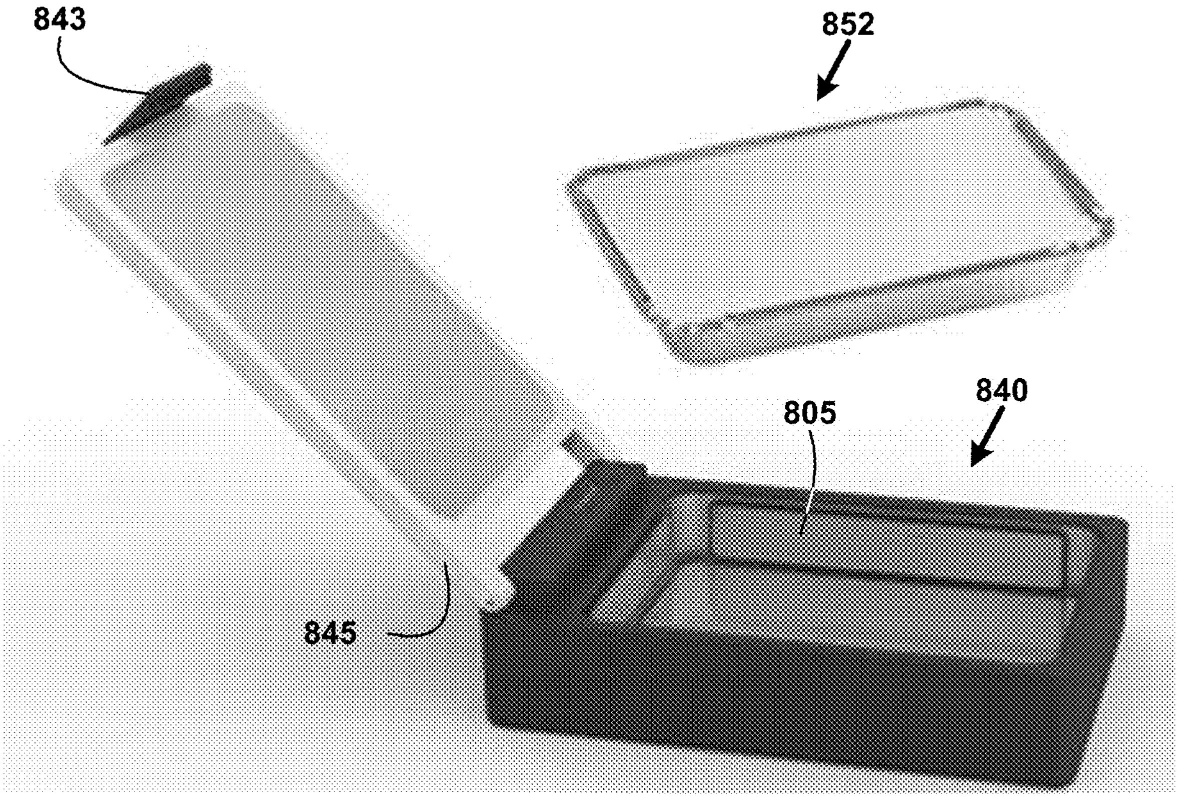
FIG. 8 shows for illustrative purposes only an example of a replaceable tray bento box of one embodiment.

FIG. 8 shows for illustrative purposes only an example of a replaceable tray bento box of one embodiment. FIG. 8 shows for illustrative purposes only an example of a replaceable tray bento box of one embodiment. FIG. 8 shows an embodiment of a removable tray bento box 840 with a hinged cover 845. The hinged cover 845 is secured when closed with a hinged cover latch 843. A removable tray 852 may be placed within the removable tray bento box 840. Upon placing the removable tray 852 in the removable tray bento box 840 pivot heat panels 805 automatically adjust their position to provide heat to the removable tray 852. The removable tray 852 may include any number of meal ingredients to suit the user and provide a variety of meal options to the user.

Figure 9:
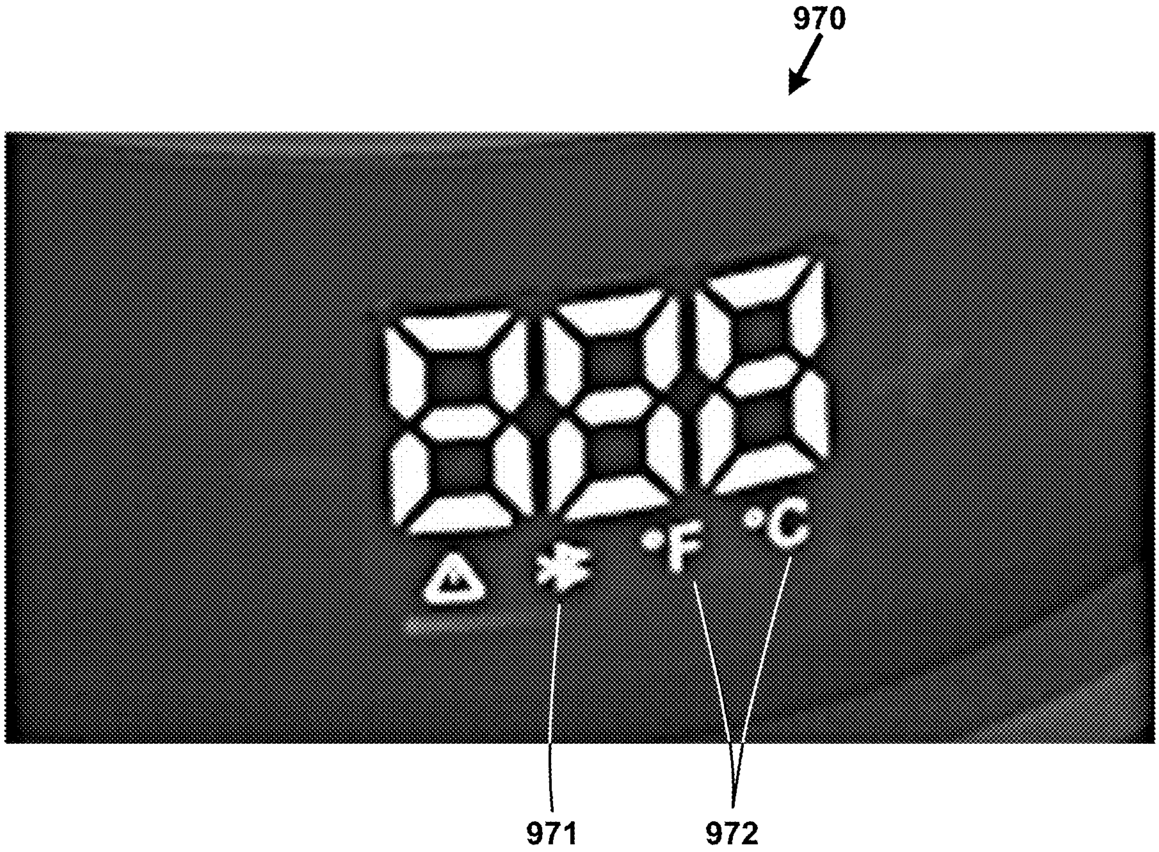
FIG. 9 shows for illustrative purposes only an example of a temperature display of one embodiment.

FIG. 9 shows for illustrative purposes only an example of a temperature display of one embodiment. FIG. 9 shows a temperature display 970 that is integrated into the bento box. The temperature display 970 shows the temperature within the bento box when heating. The temperature settings can be made in Fahrenheit or Celsius F.° or C.° indicator 972 showing which temperature scale the user has selected. The temperature may be set with the hot bento box app 106 of FIG. 1. In the instance the user wishes to set the temperature or other control with the hot bento box app 106 of FIG. 1 the temperature display 970 will highlight a connection to a wireless communications technology device including Bluetooth® indicator 971 and for including voice activated commands of one embodiment.

The temperature control includes a temperature setting touch screen adjusting feature. The temperature setting touch screen is adjustable using degrees Celsius and degrees Fahrenheit temperature scales.

Figure 10:
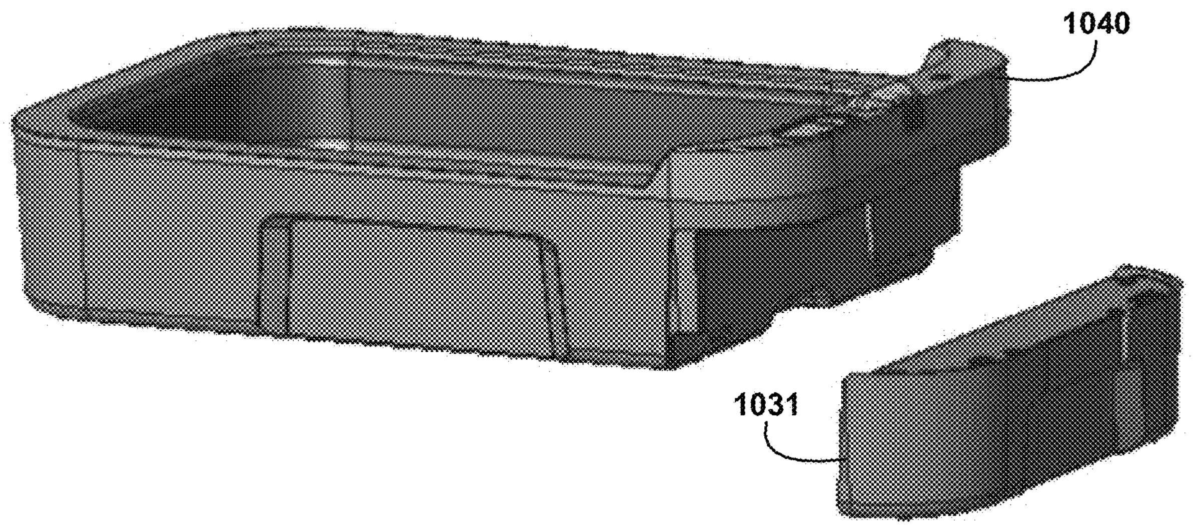
FIG. 10 shows for illustrative purposes only an example of a removable battery of one embodiment.

FIG. 10 shows for illustrative purposes only an example of a removable battery of one embodiment. FIG. 10 shows the removable battery 1031 used to power the food warming device base unit 1040. The removable battery 1031 is a rechargeable battery.

The removable battery 1031 has high current and heat-resistant capability. The removable battery 1031 system is capable of converting electrical energy from high current, heat resistant removable battery 1031 packs into food warming device base unit 1031 of FIG. 10 heat levels capable of providing food safety-in excess of 140°. The removable battery 1031 conducts power through electrical connections to Base Unit 1040. The removable battery 1031 includes a charger port for recharging the removable battery. It may be charged while removed from the base unit device using the integral charger port or while connected to the base unit device using the onboard charger port. One battery may be used to operate the base unit device while a second battery is charging. Or for extended use, additional batteries may be charged in advance and replaced as needed. High-capacity battery options will also be available of one embodiment.

Figure 11:
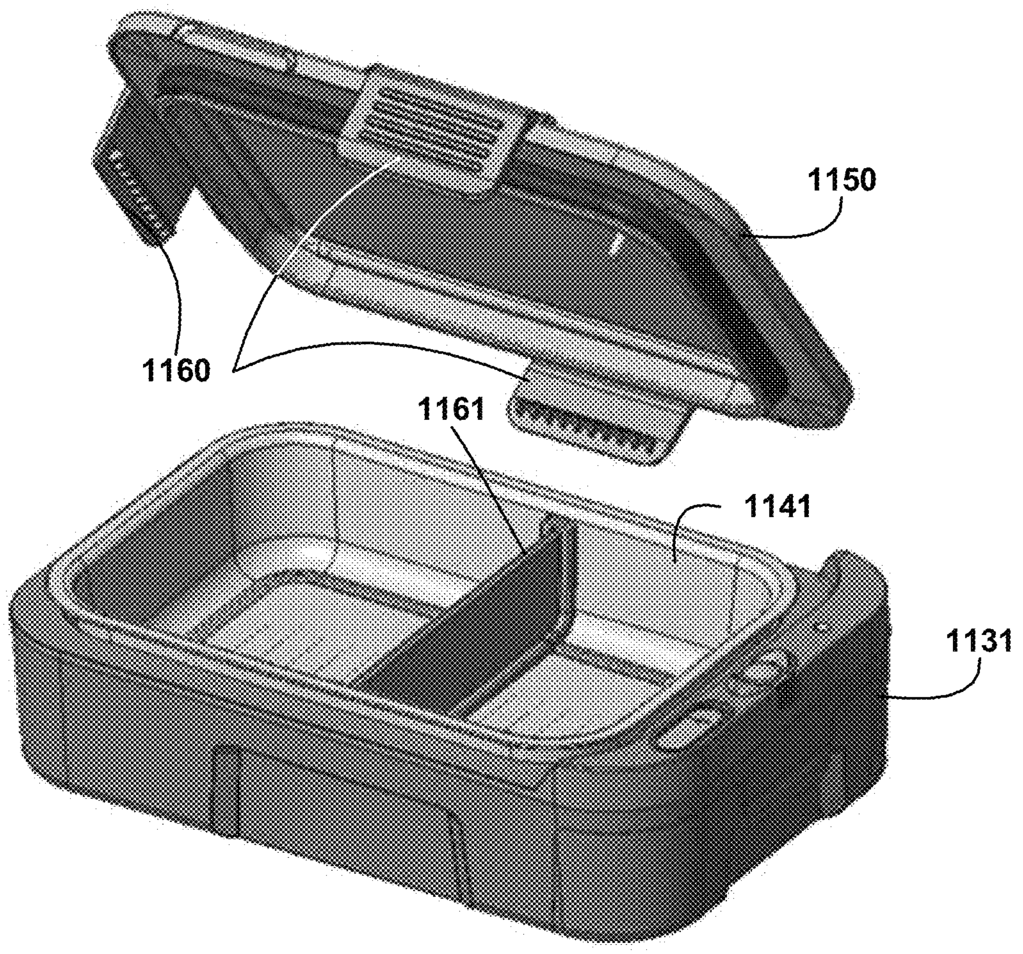
FIG. 11 shows for illustrative purposes only an example of an adjustable silicone divider of one embodiment.

FIG. 11 shows for illustrative purposes only an example of an adjustable silicone divider of one embodiment. FIG. 11 shows the adjustable silicone divider 1161 that includes side and bottom flanges wider than the center divider panel. The side and bottom wider flanges provide stability to the adjustable silicone divider 1161 to prevent movement while the different food ingredients are being heated. In instances where the food is stored in the removable nesting tray 1141 of either before or after heating, the adjustable silicone divider 1161 will maintain separation of the different food ingredients. The extended cover 1150 provides a watertight seal when closed with extended latches 1160 of one embodiment.

FIG. 11 also shows for illustrative purposes only an example of a removable nesting tray of one embodiment. FIG. 11 shows the removable nesting tray 1141 used to place food within to heat using the heating elements of the food warming device base unit 1131. The heating time varies depending on the volume of food placed in the nesting tray 1141. A high-capacity battery is available for longer heating time for larger amounts of food to be heated of one embodiment.

Figure 12:
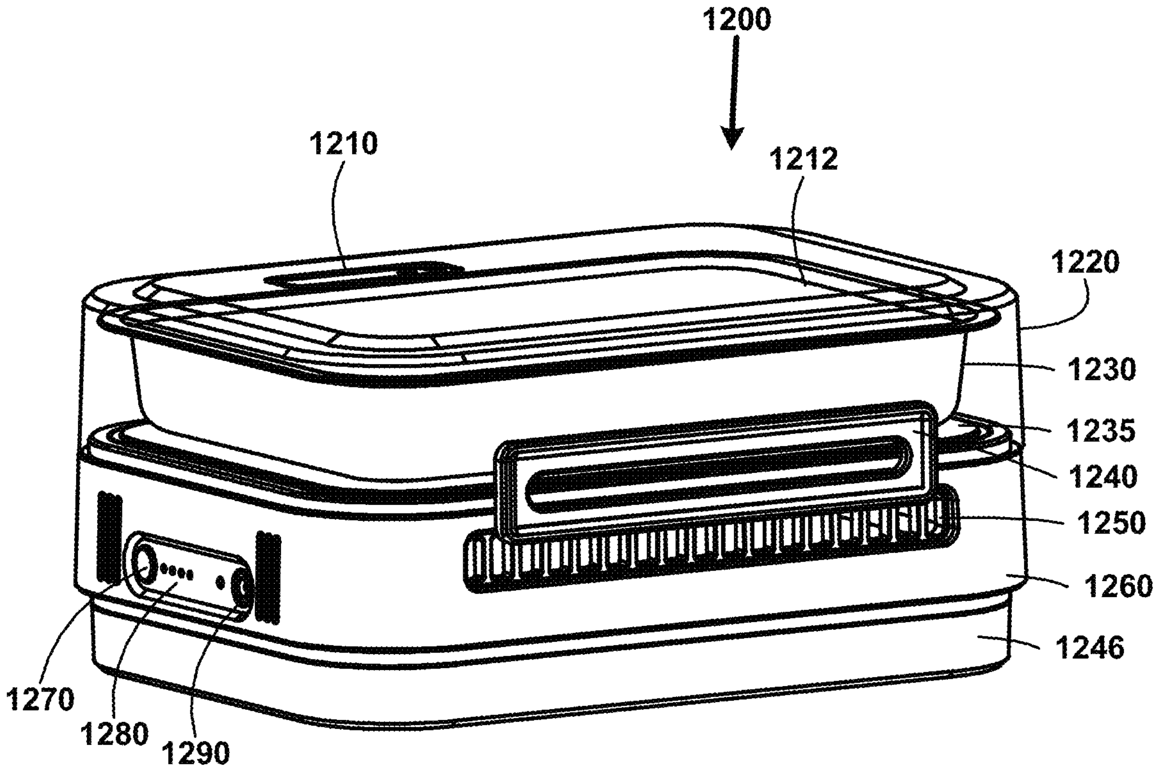
FIG. 12 shows for illustrative purposes only an example of a meal cooking and heating system of one embodiment.

FIG. 12 shows for illustrative purposes only an example of a meal cooking and heating system of one embodiment. FIG. 12 shows another embodiment of a portable battery-powered food warming system 1200 is a meal heating system with an inner tray lid 1212 covering the removable food tray insert 1230 and an outer housing lid 1220 secured to the housing with at least one cover clip 1240 forming a water tight seal with a gasket and including a pressure release vent 1210. The removable food tray insert 1230 is placed on top of a heating element 1235. The portable battery-powered food warming system 1200 further includes at least one cover clip 1240, air buffer vent 1250, a housing 1260 with LED indicators 1280, power input port 1290, power button 1270, and a high temperature/high-capacity rechargeable battery 1246.

The proprietary air buffer vent 1250 of FIG. 12 moves the battery further from the heat source and provides an insulative layer of air that is vented on all sides for maximum ventilation. In accordance with the laws of thermodynamics, heat moves from areas of higher temperature to areas of lower temperature. The hot air will vent out the sides and be replaced by cooler air, further adding to the insulative effect. The air buffer vent 1250 of FIG. 12 is protected by a grid structure to prevent foreign objects from entering. In some embodiments, a fan may be added to air buffer vent 1250 of FIG. 12 to further increase the airflow cooling effect.

The meal heating system 1200 contributes to a substantial benefit for new food preparation methods. A portable, battery-powered food heating and cooking system will have an impact on meal prep, dietary health, and food safety.

Figure 13:
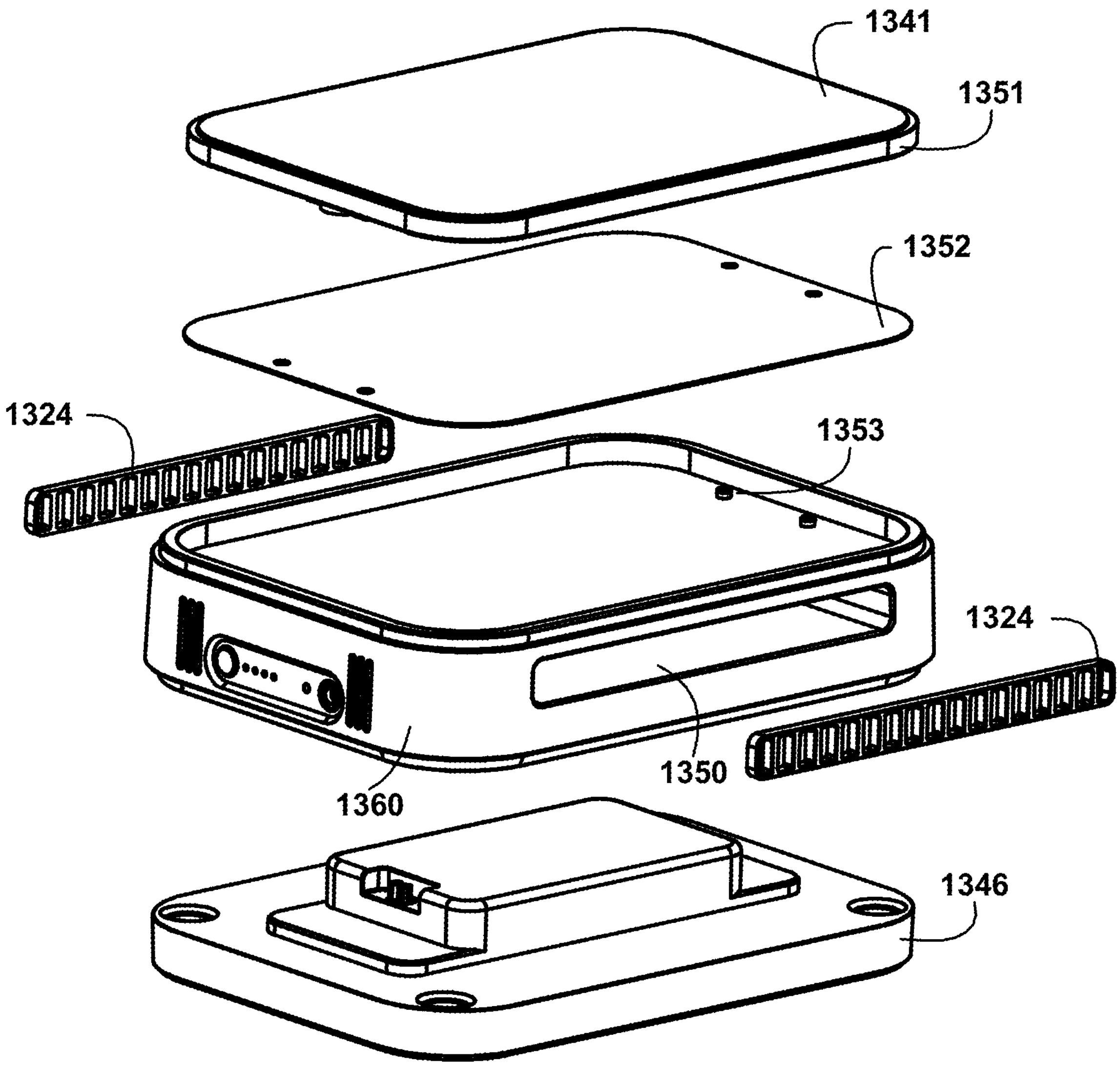
FIG. 13 shows for illustrative purposes only an example of an exploded view of a cooking system of one embodiment.

FIG. 13. shows for illustrative purposes only an exploded view of the portable cooking device of one embodiment. FIG. 13 shows an exploded view of the portable cooking device is a heating device 1360 with the heat plate 1341, encased in heat resist plastic 1351, with conductive contacts 1353, thermal insulation 1352, air buffer vent 1350, protective grill 1324, and high temperature/high-capacity battery 1346. Wherein the conductive contacts 1353 are also referred to herein as heating elements that have heat dispensing capabilities.

Figure 14:
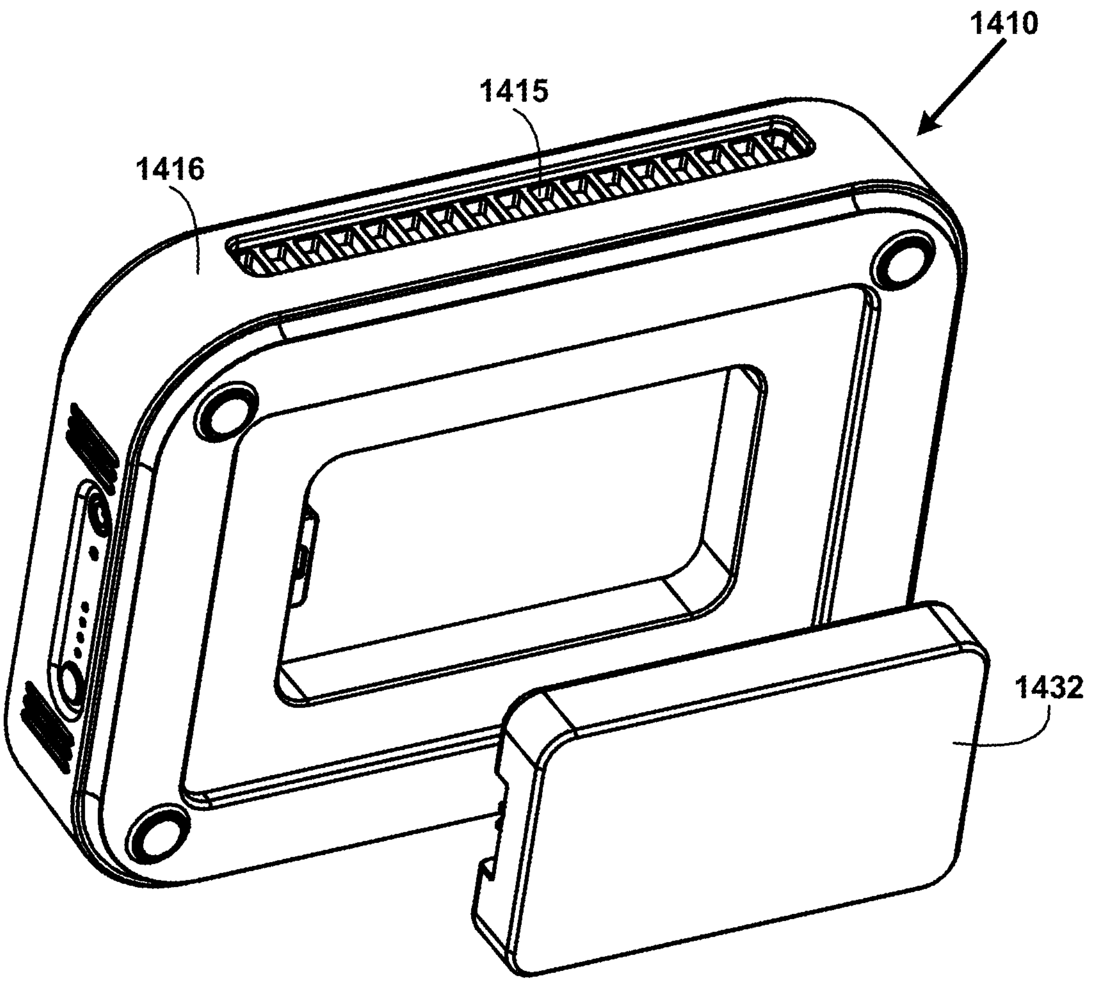
FIG. 14 shows for illustrative purposes only an example of a removable battery installed in the bottom of a cooking system of one embodiment.

FIG. 14 shows for illustrative purposes only an example of a removable battery installed in the bottom of a meal heating system of one embodiment. FIG. 14 shows a bottom view of the meal heating system 1410 with a compact removable battery 1432. The meal heating system 1410 with a compact removable battery 1432 snaps into the bottom of the device. The meal heating system 1410 is configured to reheat meals that have already been cooked. These can be leftovers placed in a reusable, removable aluminum tray or disposable packaging tray for ready meals. The meal heating system 1410 can also cook meals at temperatures exceeding 550 degrees F. The air buffer vent 1415 is protected by a grid structure to prevent foreign objects from entering the heating device 1416. The removable meal tray 1230 of FIG. 12 is placed on top of the heat plate 1235 of the meal heating system 1200 of FIG. 12. The meal cover 1220 of FIG. 12 is positioned to form a watertight seal and holds the removable meal tray 1230 of FIG. 12 in place with an O ring inside the meal cover 1220 of FIG. 12. The cover clips 1240 of FIG. 12 lock the meal cover 1220 of FIG. 12 in place.

When the power button 1270 of FIG. 12 is pressed, it activates energy flow from the high temperature/high-capacity battery 1246 of FIG. 12 to the heat plate 1235. In one embodiment, medium-level heat is supplied for a set time, usually 15-20 minutes. Other embodiments may use a different combination of time and temperature. The heat is controlled to warm already-cooked food for eating on low settings and to cook food on Medium and High settings. Low setting is also useful for food transport and party food warming. The LED indicators 1280 of FIG. 12 shows the available battery power level of one embodiment. Other embodiments may utilize fully selectable temperature and an LCD temperature display. The charging port can be used to recharge the high-temperature/high-capacity battery 1246 of FIG. 12.

Using an optional AC cord will supply power to the device and allow unlimited warming or low change to high-level cooking capability. The AC is plugged into the same port as a charging adapter in one embodiment. Other embodiments may have separate ports for each AC device.

The high-temperature/high-capacity battery 1246 of FIG. 12 can be recharged on the device via the charging port or off the device via a dedicated charge port. Recharging can be done via AC, 12 v car/marine, solar, or other power sources. The high temperature/high-capacity battery 1246 of FIG. 12 itself and the main device electronic control module contain multiple safety circuits to control charging and discharging. Some embodiments may use multiple batteries. The removable high-temperature high-capacity battery provides direct power to the device for fully portable, independent, full-function cooking use.

Figure 15:
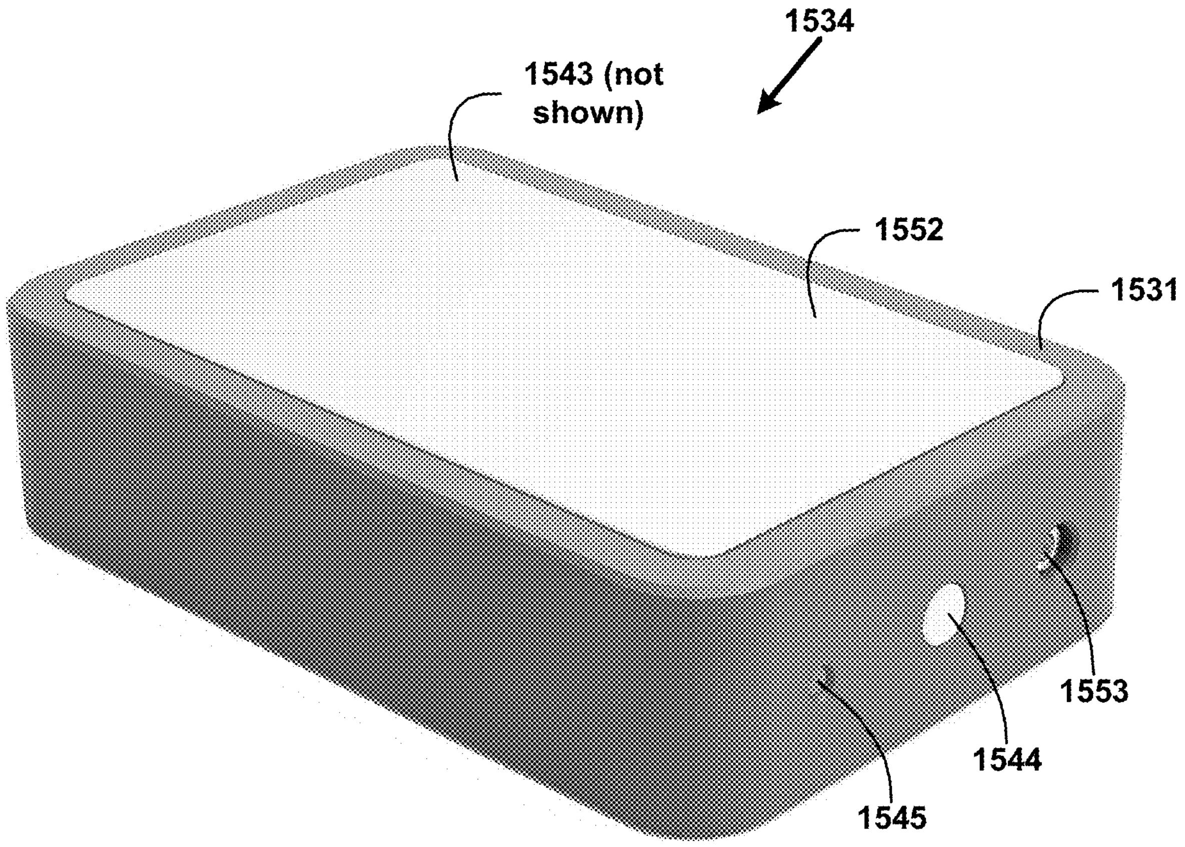
FIG. 15 shows for illustrative purposes only an example of a buffet warmer food warming module of one embodiment.

FIG. 15 shows for illustrative purposes only an example of a buffet warmer food warming module of one embodiment. FIG. 15 shows another embodiment of a buffet warmer food warming module 1534. The buffet warmer food warming module 1534 is a buffet line heating element. The buffet warmer food warming module 1534 is put underneath food dishes to keep the food in serving line warm. The buffet warmer food warming module 1534 includes a protective heating surface 1552 coupled to the main box container 1531 configured to produce heat and direct the heat to the bottom of a food container placed onto the protective heating surface 1552 for heating the food. The buffet warmer food warming module 1534 can be powered by battery or AC power. The buffet warmer food warming module 1534 replaces the noxious sterno can. The buffet warmer food warming module 1534 is also referred to herein interchangeably without change in meaning to as a heat tray.

A heat tray 1543 (not shown) inside a main box container 1531 with a protective heating surface 1552. A charging port 1553 is available for recharging batteries in the heat tray 1534 to maintain the heat and temperature settings for the food being served. A power button 1544 configured for turning on and off the heating and a power indicator light 1545 showing when the heat is on or off. The buffet warmer food warming module 1534 applications replace other typical buffet line heating methods which might pose a fire hazard, fluctuating temperatures, and obnoxious fumes. The buffet warmer food warming module 1534 additionally provides temperature controls to maintain safe food temperatures. The temperature controls for each buffet warmer food warming module 1534 are adjustable using the food warming system digital application 340 of FIG. 3 on a user's digital device 107 of FIG. 1 of one embodiment.

Figure 16:
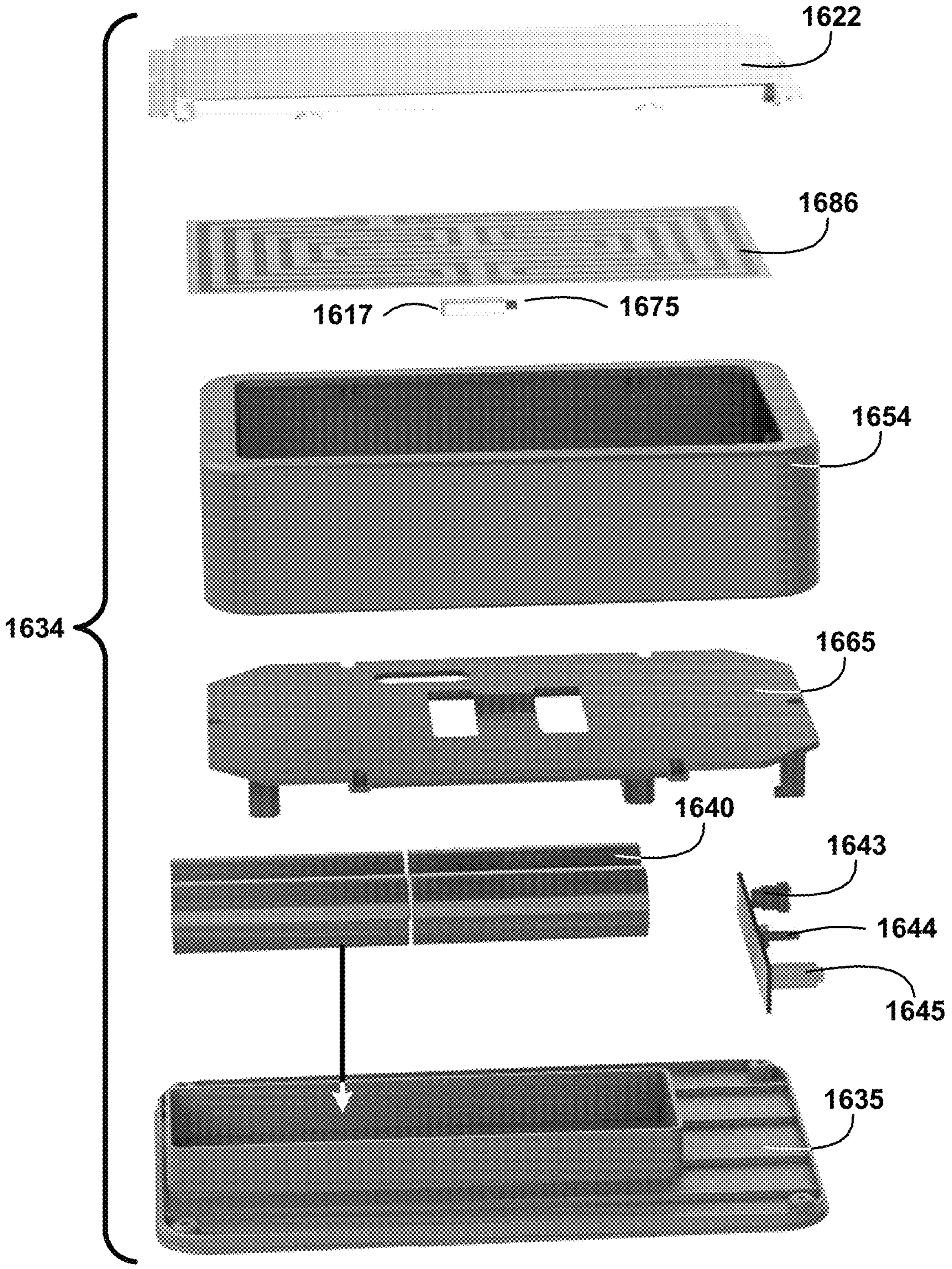
FIG. 16 shows for illustrative purposes only an example of a buffet warmer food warming module components of one embodiment.

The buffet warmer food warming module 1534 includes a control printed circuit board assembly (electronic control module) 1617 of FIG. 16, coupled to the battery box and is also referred to herein interchangeably without any change in meaning as an internal master electronic control module. The control printed circuit board assembly (electronic control module) 1617 of FIG. 16, is electrically coupled to the rechargeable battery. The control printed circuit board assembly (electronic control module) is coupled to a battery charge level device. The control printed circuit board assembly (electronic control module) is coupled to a thermometer sensor for monitoring food temperature in real time.

The control printed circuit board assembly (electronic control module) 1617 of FIG. 16, includes at least one digital processor, at least one digital memory device, at least one database; at least one thermometer coupled to the electronic control module 1617 of FIG. 16, least one digital temperature display, and at least one circuit coupled to a temperature control selection device mounted on the heat tray 1543.

The control printed circuit board assembly (electronic control module) includes at least one cellular connectivity device and transceiver for transmitting food status signal alerts, battery charge alerts and receiving user turn-off instructions. The control printed circuit board assembly (electronic control module) includes connectivity devices to Bluetooth and WI-FI to provide communication and control alternatives to the user including voice activated commands.

A rheostat device for regulating power levels conducting battery energy to a plurality of heat dispensing elements is also controlled by the control printed circuit board assembly (electronic control module) 1617 of FIG. 16. The rechargeable battery provides power to operate the food warming system components. The control printed circuit board assembly (electronic control module) 1617 of FIG. 16, controls power flow, temperature, charging and all battery safety protocols. The waterproof power button is also coupled to the control printed circuit board assembly (electronic control module) 1617 of FIG. 16, and rechargeable battery and is used to activate the system. When the system is activated, electrical power flows through electronic control module 1617 of FIG. 16, and is converted to heat which is then distributed along the heat plate 1552 of FIG. 15 of one embodiment.

The buffet warmer food warming module is an electric buffet warmer food warming module for heating food in a food container. The electric chafer transportable food warming module with an electric heat generating plate is coupled to a protective heating surface for heating food in a food container to predetermined temperatures. The protective heating surface is configured to direct the heat to the bottom of the food container adjacent to the protective heating surface for heating the food. The electric chafer transportable food warming module includes a battery pack coupled to the electric heat generating plate configured for powering the electric heat generating plate.

A frame insulating connective plate coupled to the battery pack configured to insulate the battery pack from the heat generating plate. A main box bottom with a battery compartment coupled to the frame insulating connective plate configured to contain the battery pack. An electronic temperature control device coupled to the electric heat generating plate configured to regulate temperatures produced by the electric heat generating plate to maintain predetermined food temperatures while the food is being served. A temperature setting screen coupled to the electronic temperature control configured to include digital touch buttons of temperatures when pressed will set targeted temperature setting.

FIG. 16 shows for illustrative purposes only an example of buffet warmer food warming module components of one embodiment. FIG. 16 shows Buffet Warmer food warming module components 1634 housed within a main box container 1654. The components include a main box bottom with battery compartment 1635, charging port 1643, power button 1644, power indicator light 1645, rechargeable battery pack 1640, frame insulating connective plate 1665, internal master electronic control module 1617, electrical connector 1675, heat generating plate 1686, and protective heating surface 1622 of one embodiment.

A rechargeable battery pack 1640 may include, for example, a lithium-ion rechargeable battery pack, lithium polymer (LiPo) rechargeable battery, rechargeable aluminum-based batteries, rechargeable nickel-iron battery, and other rechargeable battery types. The control printed circuit board assembly (electronic control module) 1617 of FIG. 16, may include a plurality of printed circuits configured for differing functions including electronic components and circuits for controlling the various food warming system operations as described above and in the following descriptions. The control printed circuit board assembly (electronic control module) 1617 of FIG. 16, includes multiple safety systems for battery charging and operation of one embodiment.

Figure 17:
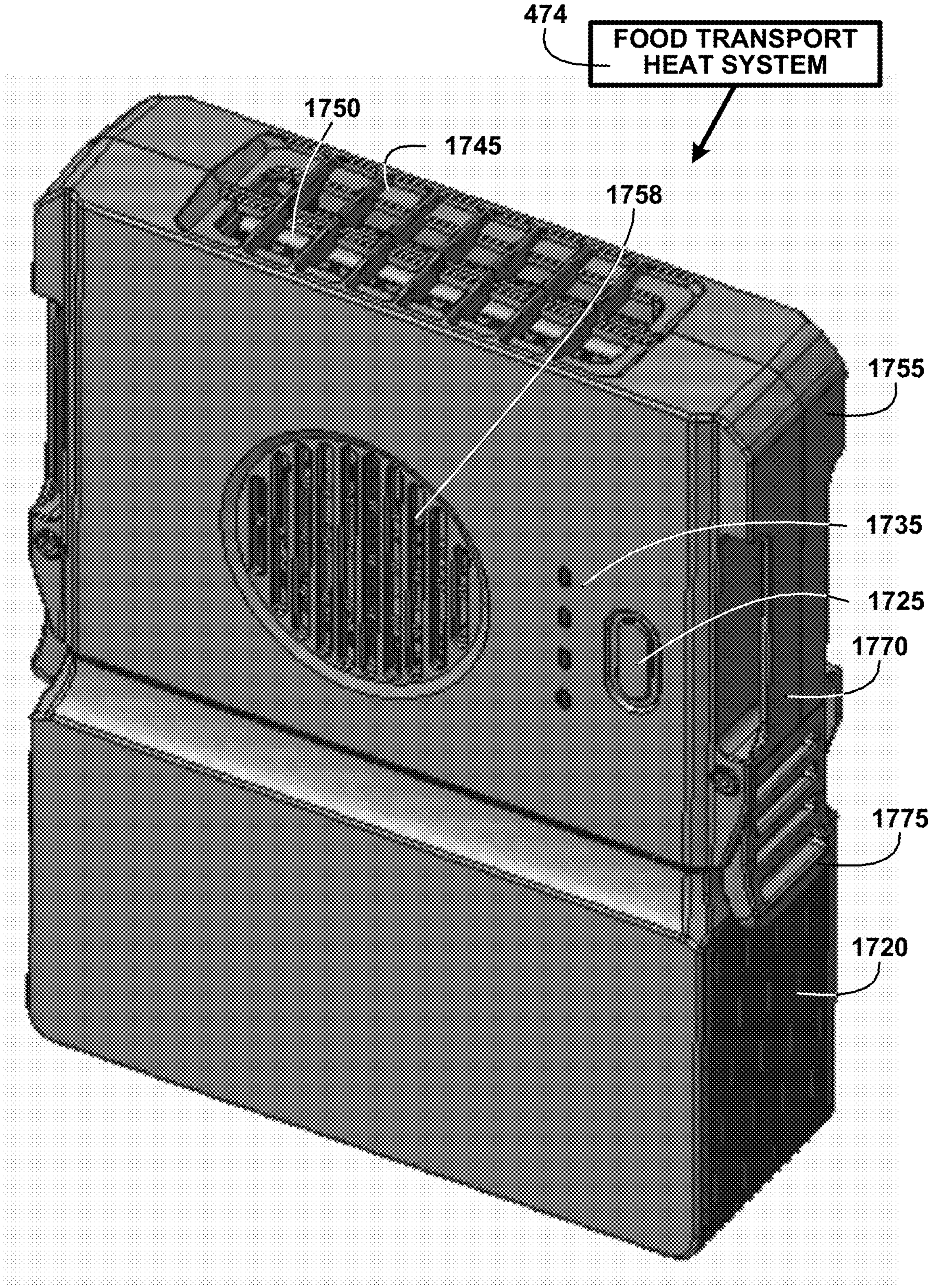
FIG. 17 shows for illustrative purposes only an example of an overview of a food transport heat system of one embodiment.

FIG. 17 shows for illustrative purposes only an example of an overview of a food transport heat system of one embodiment. FIG. 17 shows another embodiment of a food transport heat system 474 of FIG. 4 including a protective screen 1745 covering the heat element 1750 to prevent accidental burning of fingers or contents. The heater assembly 1755 includes a fan intake 1758 to produce an air flow to disperse the heat generated around the food uniformly. The integral fan is used to circulate heated air through the heating element and inside the container, improving the heating effect. LED Power level indicators 1735 allows the user to determine when the batteries may need recharging. The removable high power battery system with LED Power level indicators designed for operation in a high heat environment. A power button 1725 is used to turn the heater assembly 474 of FIG. 4 on and off. An alternative attachment option, in one embodiment, a strap attach point 1770 is used to attach a strap for carrying the food transport heat system 474 of FIG. 4 and the battery is connected directly to heat assembly 1755 and is secured with latches 1775. The battery assembly 1720 houses the batteries for powering the food transport heat system 474 of FIG. 4. The food transport heat system 474 of FIG. 4 includes transmitting food status information to a user and receiving user instructions from a user's digital device 107 of FIG. 1 using a food warming system application of one embodiment.

Figure 18:
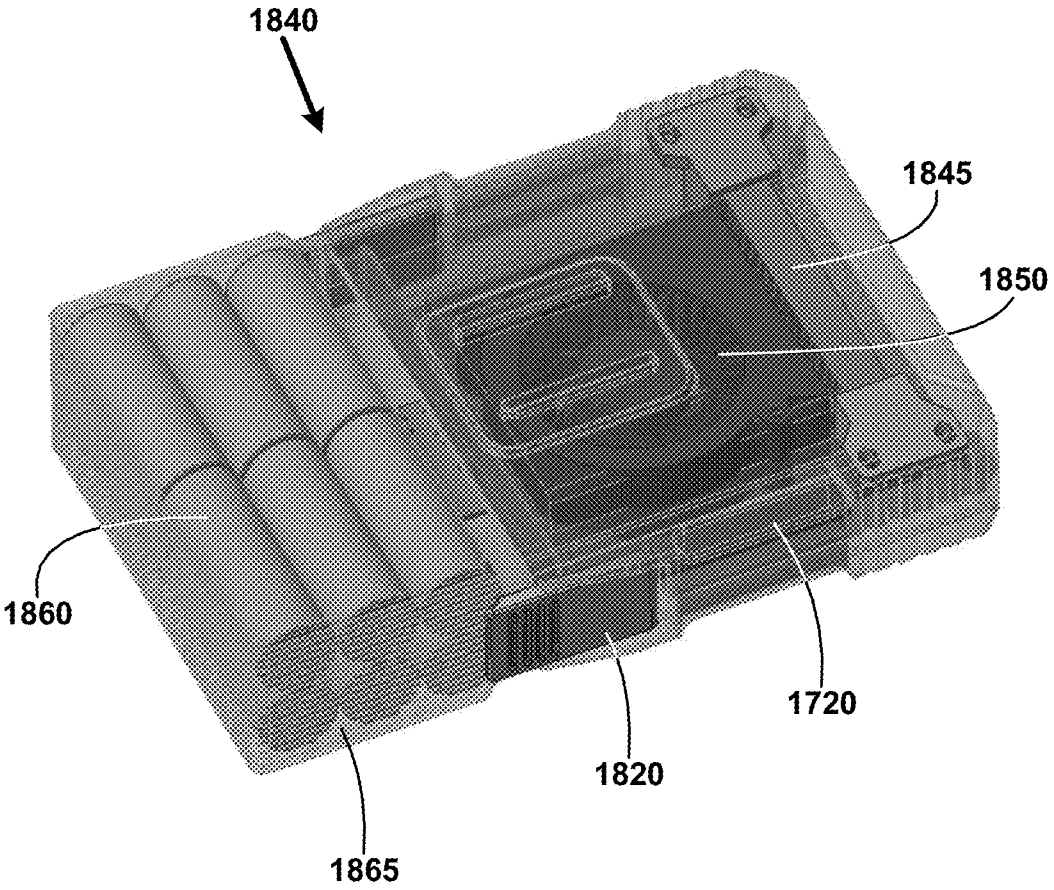
FIG. 18 shows for illustrative purposes only an example of a transparent view of a food transport heat system of one embodiment.

FIG. 18 shows for illustrative purposes only an example of a transparent view of a food transport heat system of one embodiment. FIG. 18 shows a heater assembly 1840 that includes at least one heater element 1845, a fan 1850, battery cells 1860, at least one electronic control module 1865, a latch 1820 and a battery assembly 1720. The battery cells 1860 are each a rechargeable battery. The battery cells 1860 have high current and heat-resistant capability. The battery system is capable of converting electrical energy from high current, heat resistant battery cells 1860 into heater assembly 1840 heat levels capable of providing food safety-in excess of 140°. The control printed circuit board assembly coupled to Bluetooth and Wi-Fi connectivity devices is configured for providing communication and control alternatives to the user including voice activated commands. A food warming system application configured for installation into the control printed circuit board assembly; and at least one cellular connectivity device and transceiver coupled to the control printed circuit board assembly configured for transmitting food status information to a user and receiving user instructions from a user's digital device 107 of FIG. 1 using a food warming system application of one embodiment.

Figure 19:
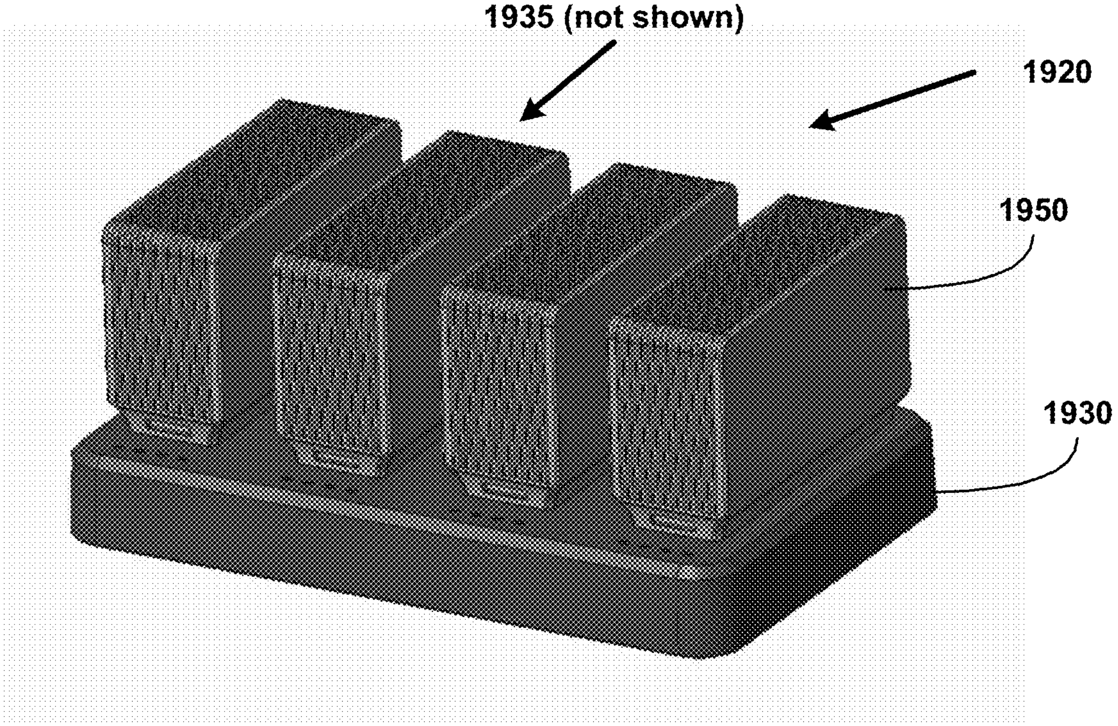
FIG. 19 shows for illustrative purposes only an example of an overview of a high power multi battery charger of one embodiment.

FIG. 19 shows for illustrative purposes only an example of an overview of a high power multi battery charger of one embodiment. FIG. 19 shows a high power multi battery charger 1920 for recharging a battery assembly 1950. The high power multi battery charger 1920 includes a charger base 1930 that displays an LED charge level indicator 1935 (not shown) individually for each of the batteries being charged of one embodiment.

Figure 20:
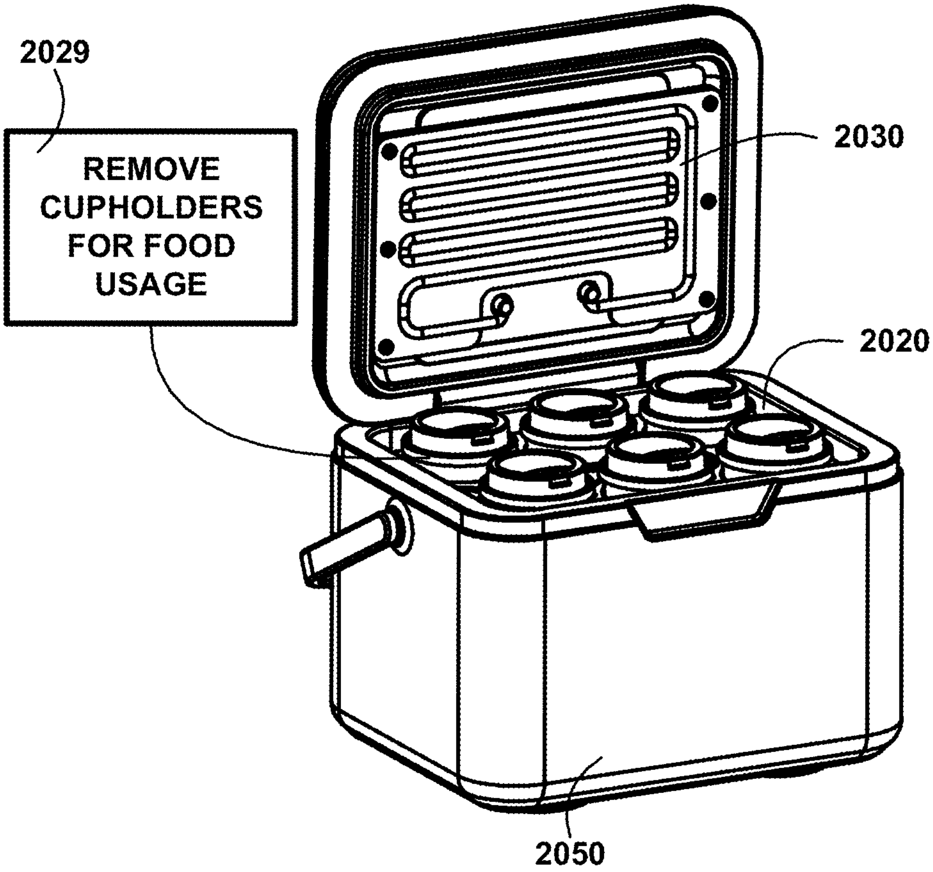
FIG. 20 shows for illustrative purposes only an example of a schematic drawing of a refrigeration system of one embodiment.

FIG. 20 shows for illustrative purposes only an example of a schematic drawing of a refrigeration system of one embodiment. FIG. 20 shows an open cold coffee caddy 2050 with evaporator plate 2030 installed inside cover and cup holder 2020. Cupholders may be removed for food usage 2029.

The power button activates the system when it is single pressed, and it also controls temperature settings when double pressed. In one example, an LED power indicator displays an LED lights indicate battery level and in temperature selection mode-selected temperature. In one embodiment, when one LED is lit, this means the temperature is below 10°. When two LEDs are lit, this means the temperature is between 10° and 40°. When three LEDs are lit, this means the temperature is between 40° and 140°. When four LEDs are lit, this means the temperature is over 140°. In another embodiment, the battery level and in temperature selection mode, the selected temperature is indicated using a gauge meter showing the battery charge level and in temperature selection mode shows a temperature as a series of lights along a bar screen with temperature readings. Other indicator components can also be used for these functions.

For cooling, when the power button is pressed, the compressor will start, which controls the flow of refrigerant. The compressor constricts the refrigerant vapor, raising its pressure, and pushes it into the condenser coils. When the hot gas in the coils meets the cooler ambient air temperature, it becomes a liquid. Now in liquid form at high pressure, the refrigerant cools down as it flows into the evaporator plate inside the insulated box. The refrigerant absorbs the heat inside the box, cooling down the air. The refrigerant evaporates to a gas, then flows back to the compressor, where the cycle starts all over.

Figure 21:
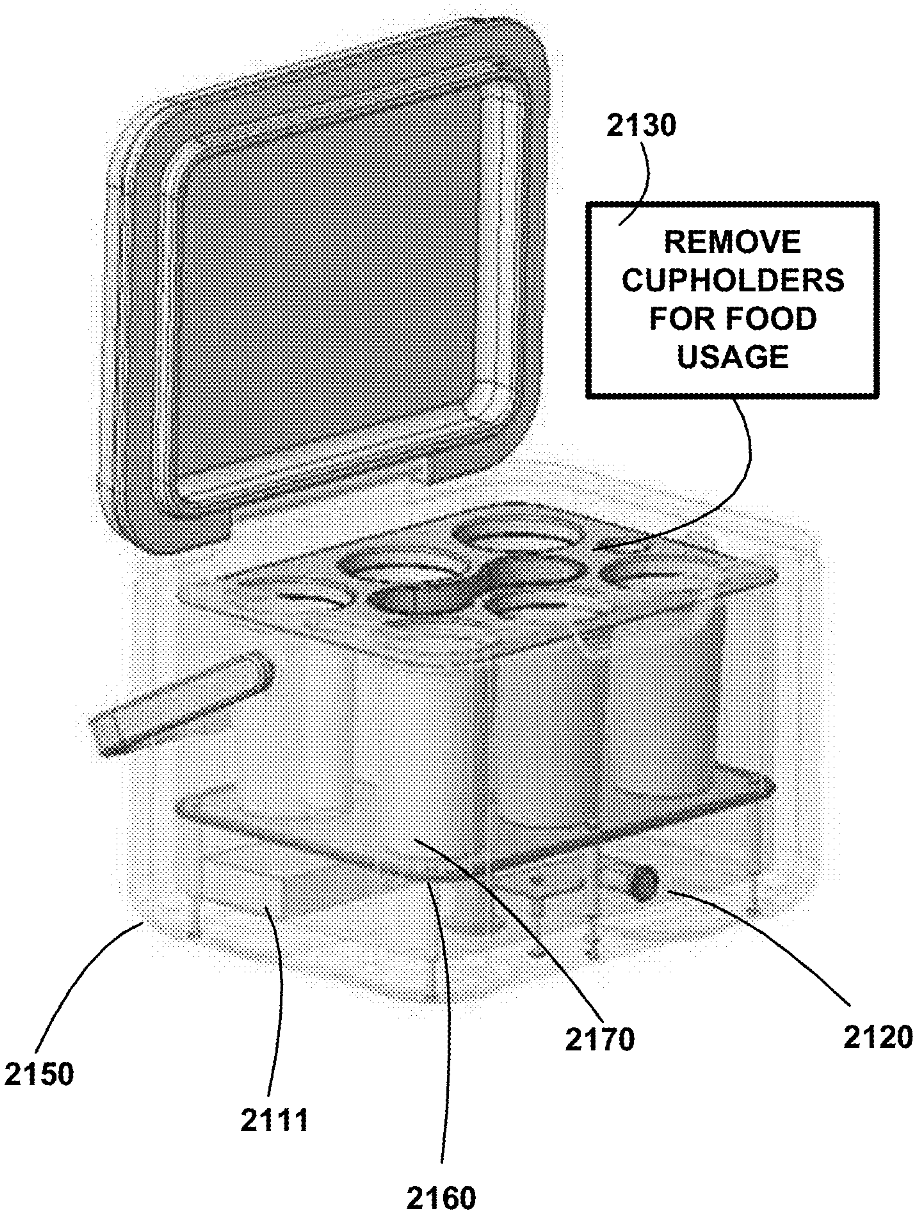
FIG. 21 shows for illustrative purposes only an example of an inner detail of a hot Coffee Caddy of one embodiment.

FIG. 21 shows for illustrative purposes only an example of an inner detail of a hot coffee caddy of one embodiment. FIG. 21 shows the inner detail of the hot coffee caddy 2150 with battery pack 2111, watertight base plate 2160, cup holder with heat film wrapping 2170, and power indicator light 2120. The hot coffee caddy is designed to keep coffee hot while being transported. The battery and control PCBA are protected in a watertight lower compartment that serves as a base for the aluminum cup holders. Each cup holder is wrapped with a heat-transmitting film that transfers heat into the coffee to maintain hot temperatures. The insulated box helps retain heat and provides an easy carry system for the transfer of hot coffee or other hot drinks.

In one embodiment, the heating or refrigeration module can be run separately and independently of each other. Whichever device is on will draw power from the battery. In another embodiment, temperature can be set, and a sensor will detect ambient internal temperature and automatically activate either heating or refrigeration as needed to maintain set temperature. Other embodiments may include a reversible heat pump with reversible valve allowing the compressor system to switch from cooling to heating. The heating and refrigerating modular devices are configured to be easily portable so that food and drinks can be warmed, chilled, or frozen anywhere. The devices are self-contained, food-safe, and waterproof to prevent damage to the system. Remove cupholders for food usage 2130.

The heating and refrigerating modular devices are configured to be easily portable so that food and drinks can be warmed, chilled, or frozen anywhere. The devices are self-contained, food-safe, and waterproof to prevent damage to the system.

Figure 22:
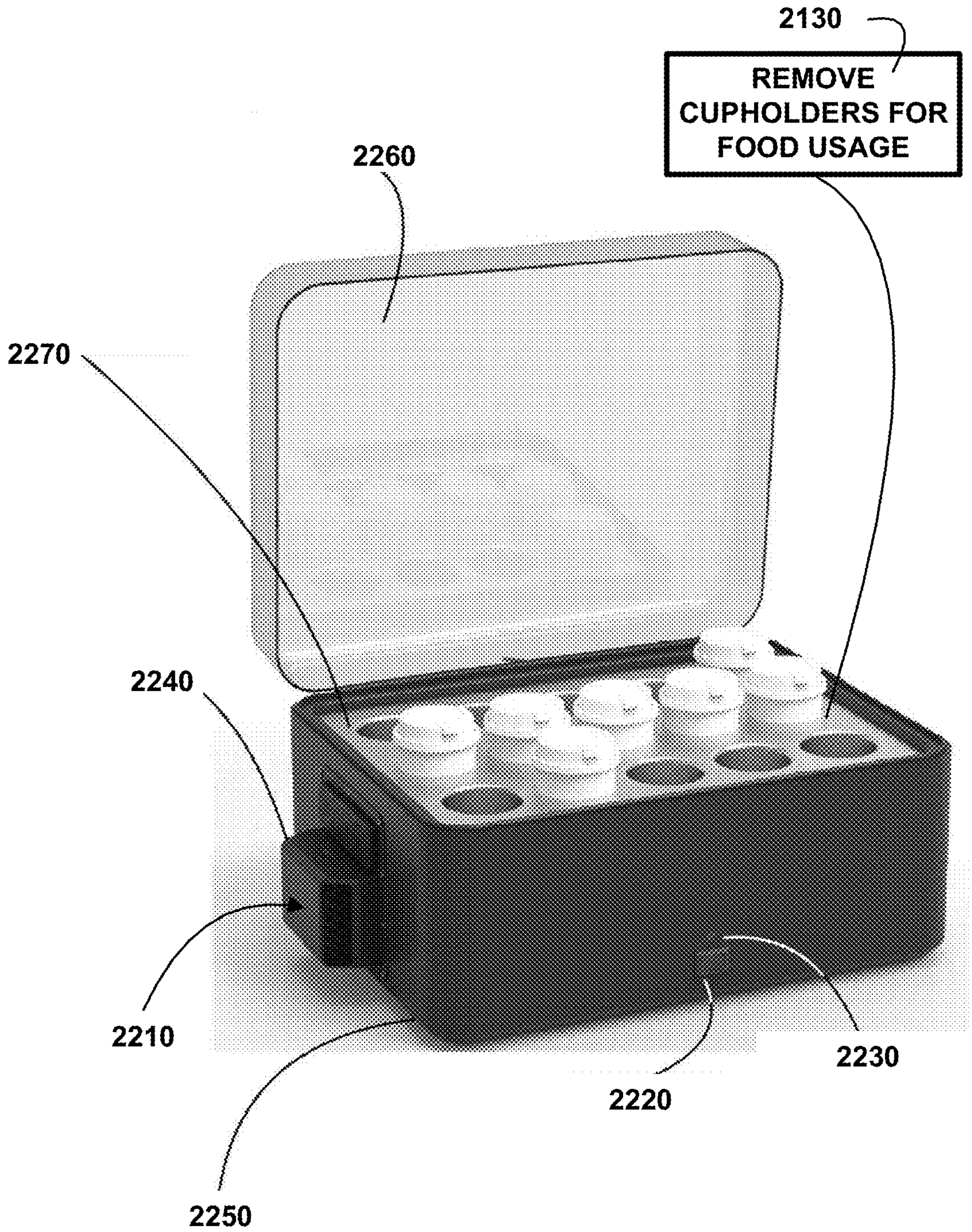
FIG. 22 shows for illustrative purposes only an example of a top view of a countertop cup heating tray of one embodiment.

FIG. 22 shows for illustrative purposes only an example of a top view of a countertop cup heating tray of one embodiment. FIG. 22 shows the countertop cooling tray 2250 including the power switch 2220, power indicator led 2230, refrigerating module 2240, rechargeable battery pack 2210, clear cover 2260, and cup holder 2270 with a 15-beverage container capacity of one embodiment. Other embodiments may utilize an insulated instead of clear cover. Remove cupholders for food usage 2130.

Figure 23:
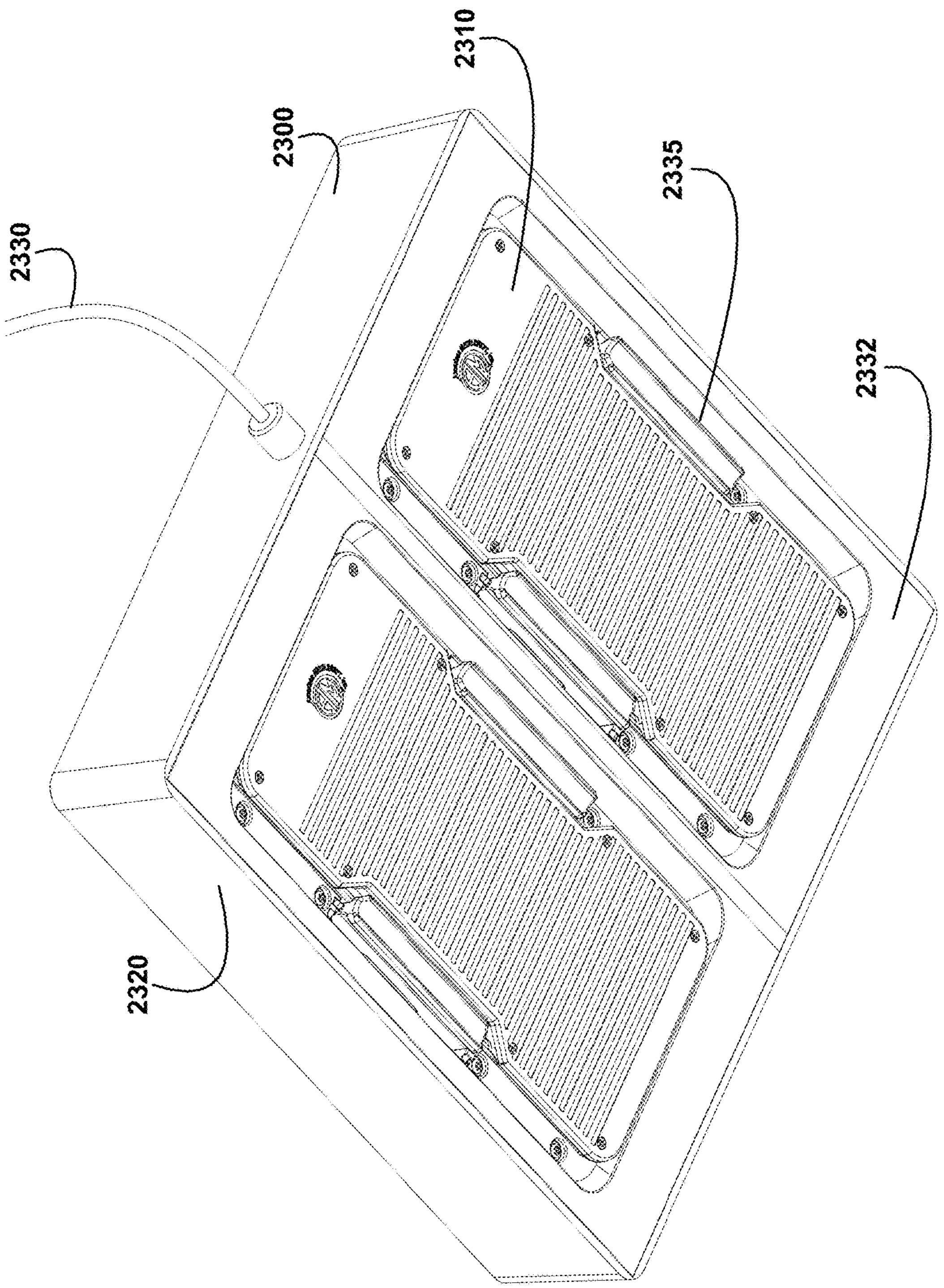
FIG. 23 shows for illustrative purposes only an example of a bottom view of an external battery pack connected to heat lamp system of one embodiment.

FIG. 23 shows for illustrative purposes only an example of a bottom view of an external battery pack connected to heat lamp system of one embodiment. FIG. 23 shows a bottom view of external battery pack 2300, metal cover 2320 with plastic battery holding system 2332, 2 battery packs 2310, battery clips 2335, connection wire 2330 connected to lamp base 2500 of FIG. 25.

Figure 24:
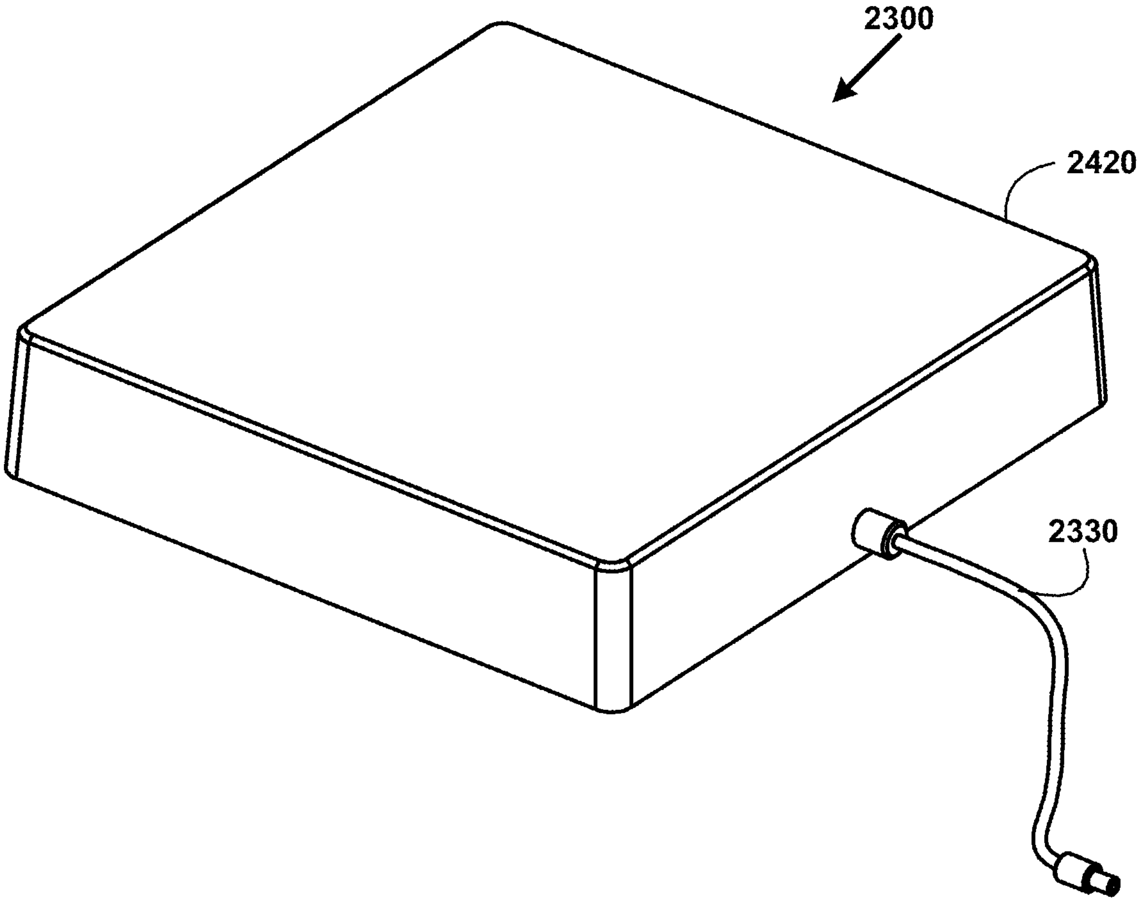
FIG. 24 shows for illustrative purposes only an example of a top view of an external battery pack for heat lamp system of one embodiment.

FIG. 24 shows for illustrative purposes only an example of a top view of an external battery pack for heat lamp system of one embodiment. FIG. 24 shows the top view of external battery pack 2300 with metal cover 2420 and connection wire 2330. The connection wire 2330 allows power from the external battery pack 2300 to power the lamp in addition to the base battery pack 2510 of FIG. 25 for extended heat generation.

Figure 25:
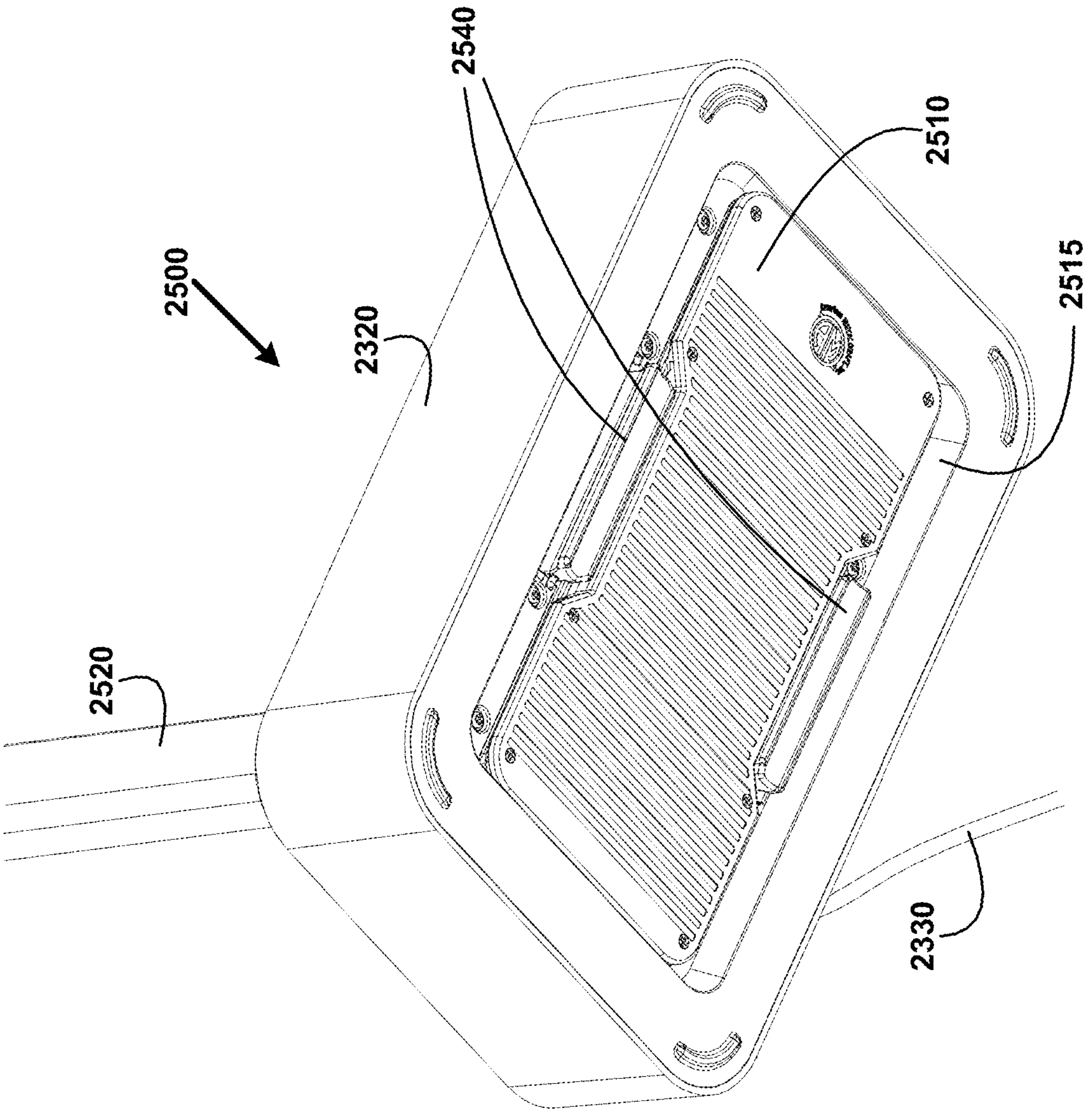
FIG. 25 shows for illustrative purposes only an example of a bottom view of the heat lamp system with battery installed of one embodiment.

FIG. 25 shows for illustrative purposes only an example of a bottom view of heat lamp system with battery installed of one embodiment. FIG. 25 shows a heat lamp battery base 2500, insulating battery compartment 2515, battery clips 2540, and base battery pack 2510. The heat lamp battery base 2500, includes an insulating battery compartment 2515, pedestal 2520 for mounting the heat lamp, and a metal cover 2320. The external battery pack 2300 of FIG. 23 is connected with connection wire 2330 to the heat lamp battery base 2500.

Figure 26:
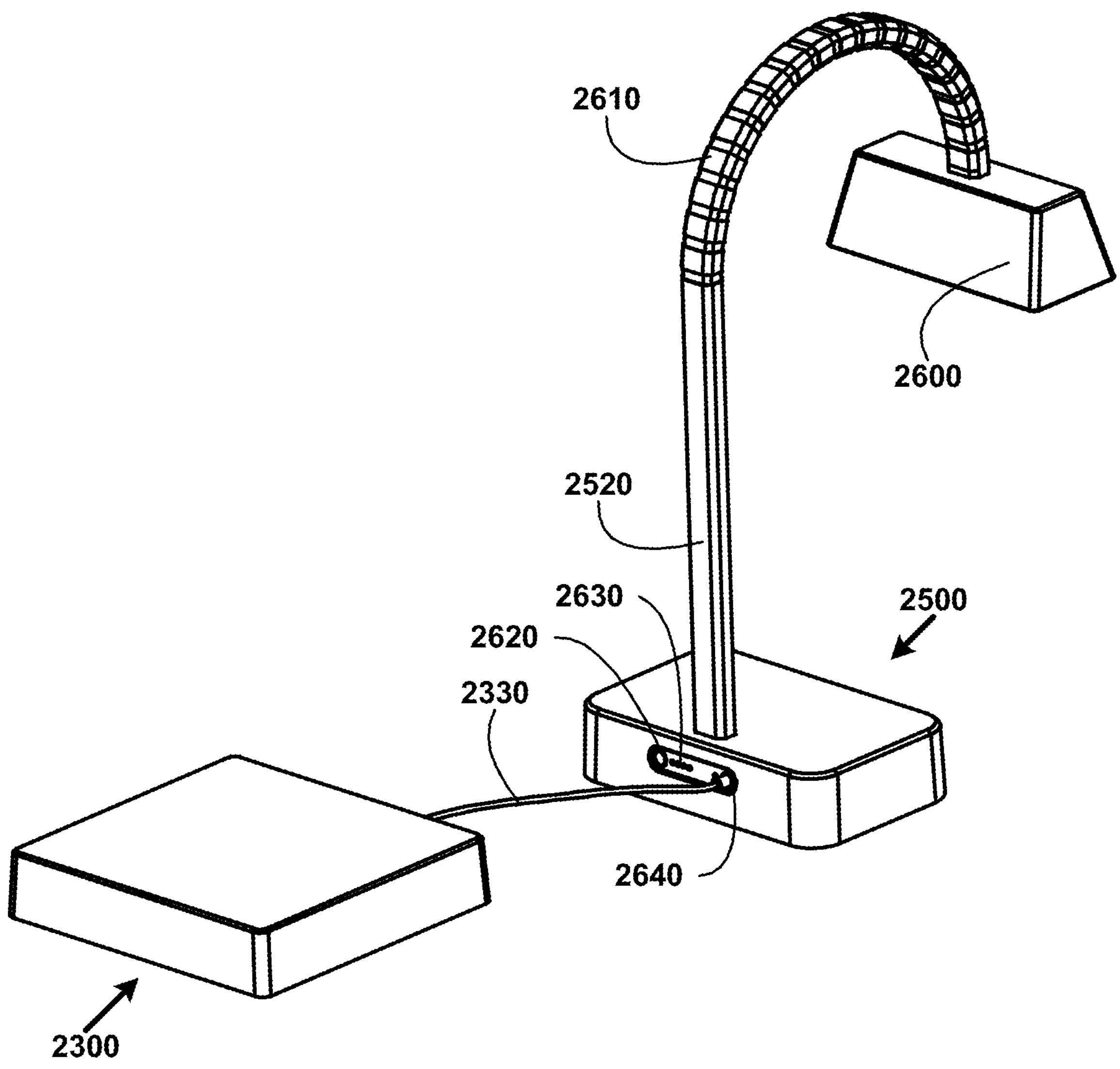
FIG. 26 shows for illustrative purposes only an example of a rear view of the heat lamp system of one embodiment.

FIG. 26 shows for illustrative purposes only an example of a rear view of heat lamp system of one embodiment. FIG. 26 shows a heat lamp system rear view of one embodiment with base 2500, pedestal 2520, flexible neck 2610, heat element reflector 2600, Power button 2620, LED Power indicator 2630, and Power input port 2640. External battery pack 2300 is connected with the connection wire 2330.

The rechargeable battery pack is directly connected to a control printed circuit board assembly (electronic control module) which controls charging, discharging and all battery safety protocols. A second electronic control module, located in insulated base, controls power flow, temperature, and system Power functions. A power button is connected to the second electronic control module and is used to activate the system. When the system is activated, electrical power flows though the electronic control module and is converted to heat in the heating element which directs the heat to food via a specially designed reflector. A series of LED indicators are also connected to the second electronic control module and show a power level of the rechargeable battery pack. Charging the rechargeable battery pack is accomplished via female power connector, a charger plug is inserted into the female power connector of one embodiment. A rack for simultaneous charging of multiple batteries may be used in another embodiment. The heat lamp system forms a self-contained, lightweight, compact, battery powered, heating device adaptable to virtually any food serving scenario. The heat lamp system may be fabricated using metal construction with interior plastic jacketing. The interior plastic jacketing may be fabricated using plastic injection, co molded silicone injection, Surface Mount (SMT) assembly providing low cost and scalable manufacturing systems of one embodiment.

The external battery pack 2300 allows for 2 additional batteries to be connected to a heat lamp for additional running time. Plugging in the connection cord will automatically override the internal battery and cause power to draw direct from external battery pack 2300. The external battery pack 2300 may lie flat on table in one embodiment or feature various mounting options in other embodiments.

The heat lamp system 2600 is configured to be easily portable so that food can be warmed in a variety of settings. Unlike traditional buffet heat lamps which are designed for stationary usage, the device is self-contained and rugged to prevent damage to the system from portable usage and to endure the rigors of commercial applications.

Batteries do not work well under heat and in some operating scenarios, the heat lamp could be delivering heat to the housing of the battery. For protection, an insulating battery compartment 2515 of FIG. 25 is coupled to the battery pack housing configured to insulate the battery pack from the heat generating element. A main box bottom with a battery compartment coupled to the frame insulating connective plate is configured to contain the battery pack.

The heat lamp system 2600 is a battery or AC powered device designed to maintain a food safe temperature over 140° f in buffet line or other food serving environments. The battery pack or AC Adapter powers the heating element. The heat element reflector focuses heat on a position selected by moving the flexible neck to a desired position.

The heat element reflector is constructed from metal and has a highly calibrated design to focus maximum heat on food located below through shape and high heat reflective finish. Unlike traditional heat lamps which provide only a circle of heat, the heat lamp system of one embodiment delivers an elongated heat footprint to better match typical food servings.

The power button activates the system and allows power to flow from Battery or AC Adapter to the heat element. Power LED light indicates Power On mode. Battery Indicator LEDs display battery charge level. The system will automatically default to AC operation when adapter cord is attached. Removing the adapter cord will default to battery usage. Under battery power, the electronic control module will control power in a pulsing manner to extend battery life.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A portable battery-powered food warming system, comprising:

a single removable food storage container removably located within an inside surface of a housing of the food warming system, wherein the single removable food storage container is thermally conductive and configured to heat food located within the single removable food storage container;

a single heating element coupled to the housing and in thermal contact with the single removable food storage container;

a single cover removably coupled to the single removable food storage container and configured to retain heat and prevent leakage of food contents within the single removable food storage container when the single cover is located on the single removable food storage container;

a plurality of snap latches integrated with the single cover and configured to secure the single cover to the single removable food storage container;

an O-ring coupled between the single cover and the single removable food storage container and configured to form a watertight seal between the single cover and the single removable food storage container;

a rechargeable battery electrically coupled to the single heating element, wherein the rechargeable battery is configured to provide power to the single heating element sufficient to heat the food within the single removable food storage container to a predetermined temperature;

a control printed circuit board assembly configured to control power flow to the single heating element, temperature of the single heating element, and charging of the rechargeable battery; and a digital temperature display integrated into an exterior of the housing configured to show a temperature within the single removable food storage container when heating the food, wherein the control printed circuit configured to allow user to adjust the temperature and the heating time of the heating via a app installed on a user's digital device; and auto shut off the power the single removable food storage container is not installed in the housing.

2. The portable battery-powered food warming system of claim 1, wherein the singe cover includes a pressure release valve embedded in the cover configured to release steam generated when heating the food when the pressure release valve is manually opened.

3. The portable battery-powered food warming system of claim 1, wherein the plurality of snap latches are configured to secure the single cover as a watertight seal to prevent accidental opening.

* * * * *